United States Patent
Fu et al.

(10) Patent No.: US 11,452,051 B2
(45) Date of Patent: Sep. 20, 2022

(54) METHOD AND DEVICE FOR REPORTING A POWER HEADROOM REPORT

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Di Su, Beijing (CN); Qi Xiong, Beijing (CN); Yingjie Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 16/478,780

(22) PCT Filed: Jan. 24, 2018

(86) PCT No.: PCT/KR2018/001087
§ 371 (c)(1),
(2) Date: Jul. 17, 2019

(87) PCT Pub. No.: WO2018/139860
PCT Pub. Date: Aug. 2, 2018

(65) Prior Publication Data
US 2019/0364519 A1  Nov. 28, 2019

(30) Foreign Application Priority Data
Jan. 24, 2017 (CN) .......................... 201710054615.6

(51) Int. Cl.
*H04W 52/36* (2009.01)
*H04W 52/32* (2009.01)
*H04L 5/00* (2006.01)

(52) U.S. Cl.
CPC ....... *H04W 52/365* (2013.01); *H04W 52/325* (2013.01); *H04L 5/0007* (2013.01)

(58) Field of Classification Search
CPC .................................................. H04W 52/365
See application file for complete search history.

(56) References Cited

U.S. PATENT DOCUMENTS

| 2012/0115537 A1 | 5/2012 | Gaal et al. |
| 2014/0349701 A1 | 11/2014 | Vajapeyam et al. |
| (Continued) | | |

FOREIGN PATENT DOCUMENTS

| EP | 2849505 A1 | 3/2015 |
| JP | 2019510441 A | 4/2019 |
| (Continued) | | |

OTHER PUBLICATIONS

ISA/KR, "International Search Report and Written Opinion of the International Searching Authority," International Application No. PCT/KR2018/001087, dated Apr. 24, 2018, 9 pages.

(Continued)

*Primary Examiner* — Khaled M Kassim
*Assistant Examiner* — Najeeb Ansari

(57) ABSTRACT

The present invention provides a method and device for reporting a Power Headroom Report (PHR), comprises: based on the type of PUCCH to be transmitted, determining the type of the PHR; based on the type of PHR, determining a corresponding power headroom and reporting the PHR. By applying this technical solution, the base station can acquire the power headroom in the power headroom report after acquiring the power headroom report, and then be aware of the usage of power for transmitting Physical Uplink Control Channel (PUCCH) from User Equipment (UE) based on the acquired power headroom, thereby, the base station can configure the number of serving cells and the feedback mode of Channel State Information (CSI) better based on the usage of power for transmitting PUCCH; meantime, the base station determines whether or not to bind the Hybrid (Continued)

Automatic Retransmission Request—Acknowledgement (HARQ-ACK).

19 Claims, 6 Drawing Sheets

(56) References Cited

U.S. PATENT DOCUMENTS

| | | | |
|---|---|---|---|
| 2015/0131567 A1 | 5/2015 | Fu et al. | |
| 2016/0029239 A1* | 1/2016 | Sadeghi | H04W 24/10 370/252 |
| 2016/0142984 A1* | 5/2016 | Lee | H04W 72/0413 370/329 |
| 2017/0019864 A1 | 1/2017 | Hwang et al. | |
| 2017/0094612 A1* | 3/2017 | Dinan | H04W 52/365 |
| 2018/0077719 A1* | 3/2018 | Nory | H04L 5/0042 |
| 2019/0098622 A1 | 3/2019 | Lee et al. | |

FOREIGN PATENT DOCUMENTS

| | | |
|---|---|---|
| KR | 10-2015-0023621 A | 3/2015 |
| KR | 10-2016-0141728 A | 12/2016 |
| WO | 2016144879 A1 | 9/2016 |
| WO | 2016178760 A1 | 11/2016 |
| WO | 2017173177 A1 | 10/2017 |

OTHER PUBLICATIONS

Japan Patent Office, "Notification of Reason for Rejection" dated Nov. 29, 2021, in connection with Japanese Patent Application No. 2019-537841, 8 pages.

CATT, "MAC Impact of Short TTI" 3GPP TSG-RAN WG2 Meeting #96, R2-167965, Reno, USA, Nov. 14-18, 2016, 4 pages.

* cited by examiner

METHOD AND DEVICE FOR REPORTING A POWER HEADROOM REPORT

CROSS-REFERENCE TO RELATED APPLICATIONS

This application is a National Phase Entry of PCT International Application No. PCT/KR2018/001087, which was filed on Jan. 24, 2018, and claims priority to Chinese Patent Application No. 201710054615.6, which was filed on Jan. 24, 2017, the content of each of which are incorporated herein by reference.

BACKGROUND

1. Field

The present invention relates to the communication field, and in particular to a method and device for reporting a Power Headroom Report (PHR).

2. Description of the Related Art

With the rapid development of Chinese economy, communication industry also accelerates the development thereof. From the appearance of the first generation communication terminal in the 1980s, to the appearance of the 3rd generation terminal equipment (3G smart mobile phone) based on mobile internet technology, all show a huge development potential of communication technology in our country. Nowadays, 3G can achieve a better wireless roaming in word-wide range, which combines wireless communication with multimedia communications such as international internet, processes a media content in various forms such as images, music, video flows and the like, and provides various information services including webpage browsing, teleconferencing and electronic commerce.

However, the development of information technology is endless, and the Long-Term Evolution (LTE) system comes out with the information data rate improved. The object of LTE system is to improve and enhance the performance of current 3G technology further to compete with the newly-developing wireless broadband access technology, for example, WiMAX, and promote the competitiveness of 3G technology in the broadband wireless access market. At the end of 2004, the LTE project was launched through a way of seminar, and the standard was basically accomplished at the end of 2008. The LTE system is an evolution of the 3G, which is commonly called 3.9G due to the employment of the key techniques of 4G. The LTE system, which improves and enhances the air access technology of 3G, is a fusion of mobile communication and broadband wireless access. Generally speaking, the LTE system greatly improves the data service ability of current 3G technology, to ensure competitive advantage of 3G technology in the following years compared with other wireless communication technology. At present, almost all the tele-communication operator and equipment manufacturer start to develop LTE, resulting in a rapid development thereof. Meanwhile, because LTE technology can provide a greater technology advantage and economic advantage to tele-communication enterprises such as the operator and the equipment manufacturer, the development state of LTE is drawing a widespread attention.

In the LTE system, a larger operation bandwidth is obtained by combining a plurality of Component Carriers (CCs), wherein, each CC can be called serving cell, constituting uplink and downlink of the communication system, i.e., Carrier Aggregation (CA) technique, so as to support a higher transmission rate. For a UE configured into a CA mode, one of cells is a Primary cell (Pcell), and other cells are called Secondary cell (Scell). According to the LTE method, Physical Uplink Shared Channel (PUSCH) can be transmitted on all the uplink serving cells, while Physical Uplink Control Channel (PUCCH) is transmitted on the Pcell or designated uplink Scell.

In order to provide references for scheduling uplink resource for the base station in the LTE system, UE needs to report residual power headroom about PUCCH and PUSCH to the base station, while how to determine the power headroom becomes the key problem to be solved in the LTE system as well.

SUMMARY

In order to overcome or at least partially resolve the above technical problems, the following technical solutions are provided.

An embodiment of the present invention provides a method for reporting a Power Headroom Report (PHR), comprising the following steps of:

determining the type of the PHR, based on the type of Physical Uplink Control Channel PUCCH to be transmitted;

determining a corresponding power headroom based on the type of the PHR, and reporting the PHR.

Another embodiment of the invention provides a device for reporting the PHR, comprising: an information determination module and an information report module;

an information determination module, configured to, based on the type of PUCCH, determine the type of the PHR;

an information report module, configured to, based on the type of the PHR, determine a corresponding power headroom, and report the PHR.

Based on the type of PUCCH to be transmitted from the UE, the technical solution determines the type of a power headroom, and then according to the type of the power headroom, determines the corresponding power headroom, and reports the power headroom to a receiving unit, for example, the base station, such that the base station obtains the power headroom in the PHR after receiving the PHR. Based on the obtained power headroom, the base station can be aware of the usage of power for transmitting PUCCH from UE. Therefore, based on the usage of power for transmitting PUCCH, the base station can configure the number of serving cells and the feedback mode of period Channel State Information (CSI) better, at the same time, determine whether or not to bind the Hybrid Automatic Retransmission Request—Acknowledgement (HARQ-ACK).

Additional aspects and advantages of the present invention will be partially given and become apparent from the description below, or will be well learned from the practices of the present invention.

BRIEF DESCRIPTION OF THE DRAWINGS

The above and/or additional aspects and advantageous of the present invention will become apparent and easy to be understood from the following descriptions of embodiments with reference the accompanying drawings, in which.

DETAILED DESCRIPTION

Figure 1:
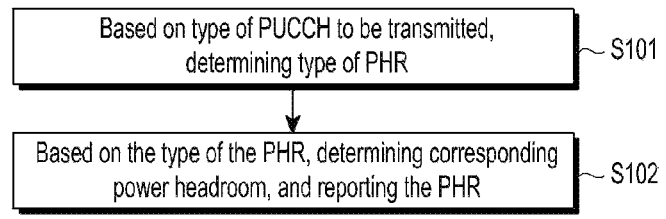
FIG. 1 is a flowchart of a method for reporting PHR of one embodiment of the present invention.

Embodiments of the present invention will be described in detail hereinafter. The examples of these embodiments are illustrated in the accompanying drawings throughout which the same or similar reference numerals refer to the same or similar elements or elements having the same or similar functions. The embodiments described with reference to the accompanying drawings are illustrative, merely used for explaining the present invention and should not be regarded as any limitations thereto.

It can be understood by those skilled in the art, the singular forms "a", "an", "said" and "the" are intended to include the plural forms as well, unless expressly stated otherwise. It will be further understood that the term "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In addition, "connected to" or "coupled to" as used herein can comprise wireless connection or coupling. As used herein, the term "and/or" includes any and all combinations of one or more of the associated listed items.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

FIG. 1 is a flowchart of a method for reporting Power Headroom Report (PHR) of one embodiment of the present invention.

It should be illustrated that the executive body of the embodiment is User Equipment (UE).

Step S101: based on the type of the Physical Uplink Control Channel (PUCCH) to be transmitted, determining the type of the PHR; step S102: based on the type of PHR, determining the corresponding power headroom, and reporting the PHR.

A type of power headroom is determined based on the type of PUCCH to be transmitted on the UE, and a corresponding power headroom is determined according to the type of power headroom, then the power headroom is reported so that a receiving terminal, for example, the base station, can be aware of the usage of power for transmitting PUCCH from UE. Therefore, based on the usage of power of PUCCH, the base station can configure the number of serving cells and determine whether or not to bind the Hybrid Automatic Retransmission Request Acknowledgement (HARQ-ACK) better, and meanwhile configure the feedback of periodic Channel State information (CSI) better.

Further illustrations for specific implements of each step are as below:

Step S101: determining the type of PHR based on the type of PUCCH to be transmitted;

wherein, the type of PUCCH is classified as the first type of PUCCH and the second type of PUCCH; the first type of PUCCH is located in at least one timeslot and occupies more orthogonal frequency division multiplexing (OFDM) symbols than a preset value M (M is a positive integer, preset by protocol or configured by high layer signaling); the second type of PUCCH is located in at least one OFDM symbol in one timeslot, and occupies OFDM symbols which is less than or equal to a value P (P is a positive integer, preset by protocol or configured by high layer signaling).

The type of PUCCH configured based on the high layer signaling is the first type of PUCCH or the second type of PUCCH; or the type of PUCCH transmitted by UE may be the first type of PUCCH or the second type of PUCCH; the type of PUCCH indicated based on the physical layer signaling is the first type of PUCCH or the second type of PUCCH; or the type of PUCCH transmitted by UE may be the first type of PUCCH or the second type of PUCCH, or the first type of PUCCH and the second type of PUCCH transmitted in the same timeslot at the same time.

Figure 2:
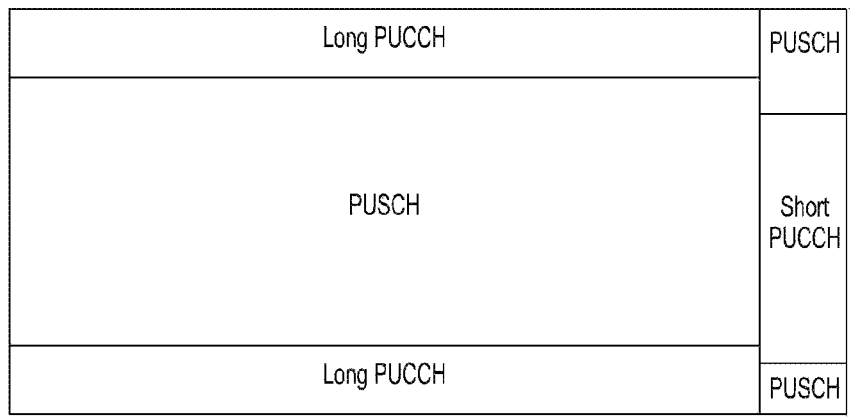
FIG. 2 is a schematic diagram of the first type Physical Uplink Control Channel (PUCCH) and the second type of PUCCH, which are not overlapped in time, to be transmitted by UE of one preferable embodiment of the present invention.
Figure 3:
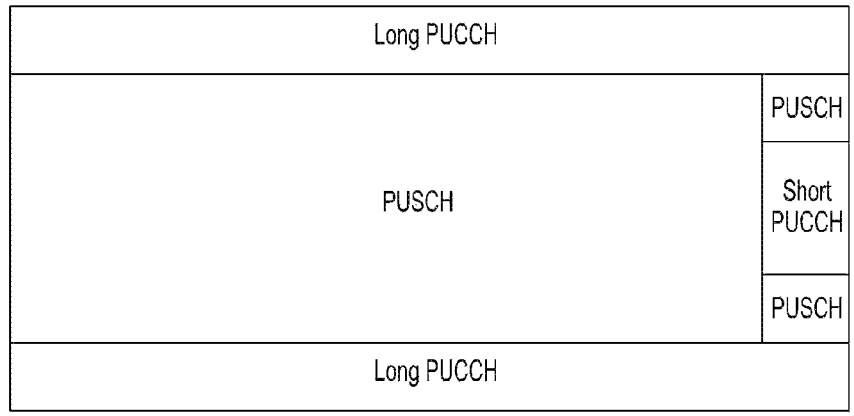
FIG. 3 is a schematic diagram of the first type of PUCCH and the second type of PUCCH, which are overlapped in time, to be transmitted by UE of one preferable embodiment of the present invention.

Besides, as shown in FIG. 2, the first type of PUCCH and the second type of PUCCH are transmitted without overlapping in time; but there might be that, as shown in FIG. 3, the first type of PUCCH and the second type of PUCCH may be transmitted and overlapped in time. If the UE does not configure a plurality of PUCCH cell groups, that is, the UE transmits PUCCH only in Primary cell (Pcell), then, whether UE is configured to be capable of transmitting PUCCH and PUSCH in the same timeslot simultaneously or not in the embodiment is with respect to all of the serving cells; if the UE configures a plurality of PUCCH cell groups, that is, the UE not only transmits PUCCH in Pcell, but also transmits PUCCH in designated Secondary cells (Scells), then, whether UE is configured to transmit PUCCH and PUSCH in the same timeslot simultaneously or not in the embodiment is with respect to the serving cells of each PUCCH cell group.

Wherein, the type of PHR comprises at least one of the followings: the PHR type 1, the PHR type 2, the PHR type 1 for the second type of PUCCH and the PHR type 2 for the second type of PUCCH.

Specifically, the step of determining the type of PHR based on the type of the PUCCH to be transmitted, comprises: when it is configured that the PUSCH and the first type of PUCCH are to be transmitted simultaneously in any timeslot, the type of PHR is determined to comprise at least one combination of the following: the PHR type 1 and the PHR type 2; the PHR type 1 and the PHR type 1 for the second type of PUCCH; PHR type 1 and PHR type 2 for the second type of PUCCH; when it is configured that the PUSCH and the second type of PUCCH are to be transmitted simultaneously in any timeslot, the type of PHR is determined to comprise at least one combination of the following: the PHR type 1 and the PHR type 2; the PHR type 1 and the PHR type 1 for the second type of PUCCH; the PHR type 1 and the PHR type 2 for the second type of PUCCH.

Based on the type of PUCCH to be transmitted, the step of determining the type of PHR further comprises: when it is not configured that the PUSCH and the first type of PUCCH are to be transmitted simultaneously in any timeslot, and the type of PUCCH to be transmitted is the first type of PUCCH, and the first type of PUCCH and PUSCH to be transmitted are transmitted by using frequency division multiplexing, the type of PHR is determined to be the PHR type 1.

It should be illustrated that the PHR type 1 is the type of PHR capable of transmitting PUSCH in all of the uplink serving cells; the PHR type 2 is the type of PHR capable of transmitting PUSCH in all of the uplink serving cells and transmitting the first type of PUCCH or the second type of PUCCH in Pcell or designated Scells; the PHR type 1 for the second type of PUCCH is the type of PHR capable of transmitting PUSCH in all of the uplink serving cells and transmitting the second type of PUCCH in Pcell or designated Scells; the PHR type 2 for the second type of PUCCH is the type of PHR capable of transmitting PUSCH in all of the uplink serving cells and transmitting the second type of PUCCH in Pcell or designated Scells.

Figure 4:
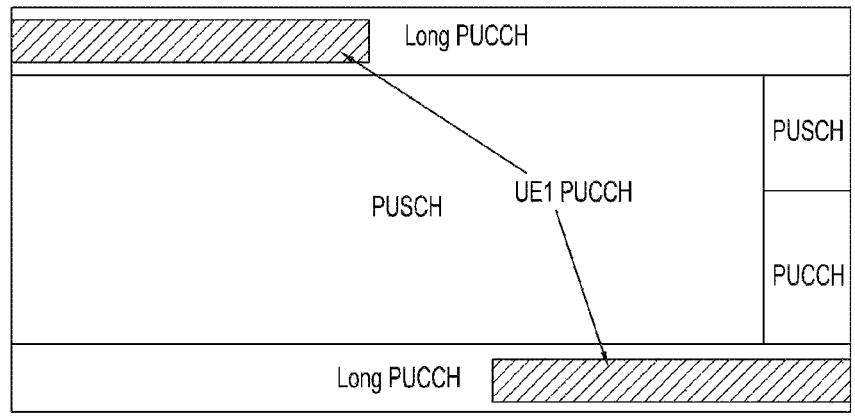
FIG. 4 is a schematic diagram of the first type of PUCCH to be transmitted by the UE, which is transmitted by using frequency division multiplexing with Physical Uplink Shared Channel (PUSCH), of further preferable embodiment of the present invention.

Further illustrations for step S101 in nine scenarios are as below:

Scenario 1, as shown in FIG. 4: when the type of PUCCH to be transmitted is the first type of PUCCH, and the first type of PUCCH to be transmitted and the PUSCH to be transmitted are transmitted by using frequency division multiplexing, when UE is not configured that the PUSCH and the first type of PUCCH are to be transmitted simultaneously in any timeslot, determining the type of PHR as the PHR type 1; when UE is configured that the PUSCH and the first type of PUCCH are to be transmitted simultaneously in any timeslot, the type of PHR is determined as the PHR type 1 and the PHR type 2.

Figure 5:
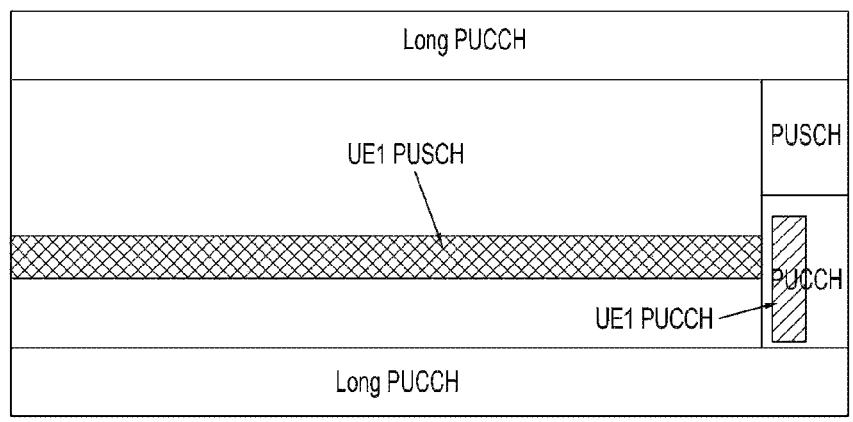
FIG. 5 is a schematic diagram of the second type of PUCCH to be transmitted by the UE which is transmitted by using time division multiplexing with PUSCH, of another preferable embodiment of the present invention.

Scenario 2, as shown in FIG. 5: when the type of PUCCH to be transmitted is the second type of PUCCH, and the second type of PUCCH to be transmitted and the PUSCH to be transmitted are transmitted by using time division multiplexing, and UE is configured that the PUSCH and the second type of PUCCH are to be transmitted simultaneously in any timeslot, the type of PHR is determined as the PHR type 1 for the second type of PUCCH and the PHR type 1.

Figure 6:
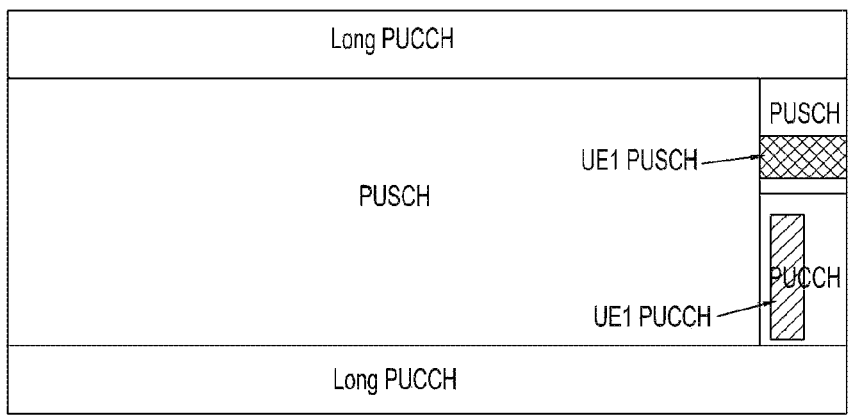
FIG. 6 is a schematic diagram of the second type of PUCCH to be transmitted by the UE, which is transmitted by using frequency division multiplexing with PUSCH, of one preferable embodiment of the present invention.

Scenario 3, as shown in FIG. 6: when the type of PUCCH to be transmitted is the second type of PUCCH, and the second type of PUCCH to be transmitted and the PUSCH to be transmitted are transmitted by using frequency division multiplexing, and UE is configured that the PUSCH and the second type of PUCCH are to be transmitted simultaneously in any timeslot, the type of PHR is determined as the PHR type 1 for the second type of PUCCH or the PIER type 1 and the PHR type 2.

Figure 7:
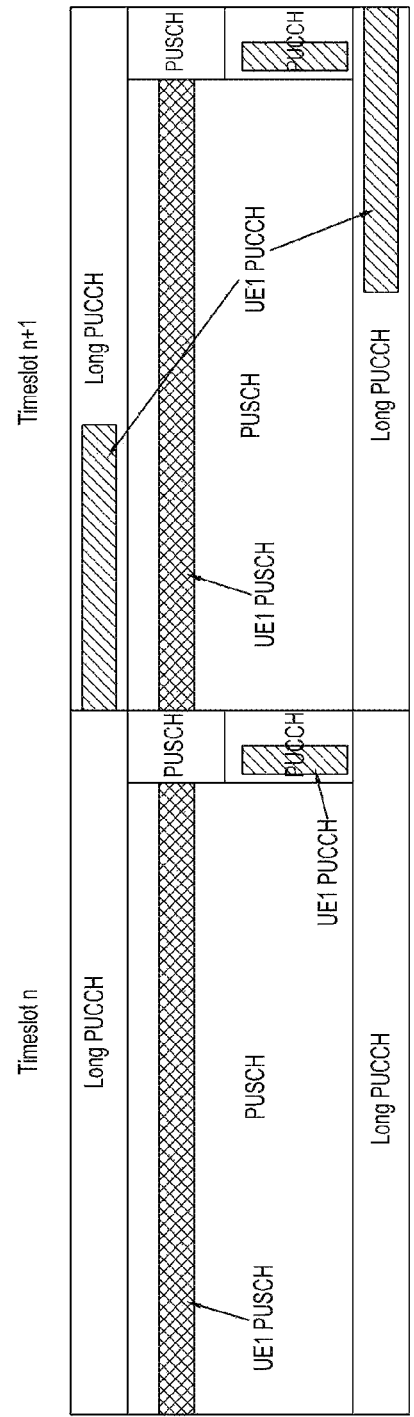
FIG. 7 is a schematic diagram showing the transmission of the second type of PUCCH or the first type of PUCCH to be transmitted by the UE and the second type of PUCCH or the first type of PUCCH to be transmitted in the same timeslot, in which the first PUCCH and PUSCH are transmitted by using frequency division multiplexing and the second type of PUCCH and PUSCH are transmitted by using time division multiplexing, of another preferable embodiment of the present invention.

Scenario 4, as shown in FIG. 7: when the type of PUCCH to be transmitted is the first type of PUCCH or the second type of PUCCH, and the first type of PUCCH or the second type of PUCCH is to be transmitted in the same timeslot, the first type of PUCCH to be transmitted and the PUSCH to be transmitted are transmitted by frequency division multiplexing, the second type of PUCCH to be transmitted and the PUSCH to be transmitted are transmitted by time division multiplexing, when UE is configured that PUSCH and the first type of PUCCH are to be transmitted simultaneously in any timeslot, the type of PHR is determined as the PHR type 1 and the PHR type 2; when UE is configured that PUSCH and the second type of PUCCH are to be transmitted simultaneously in any timeslot, the type of PHR is determined as the PHR type 1 for the second type of PUCCH and the PHR type 1.

Figure 8:
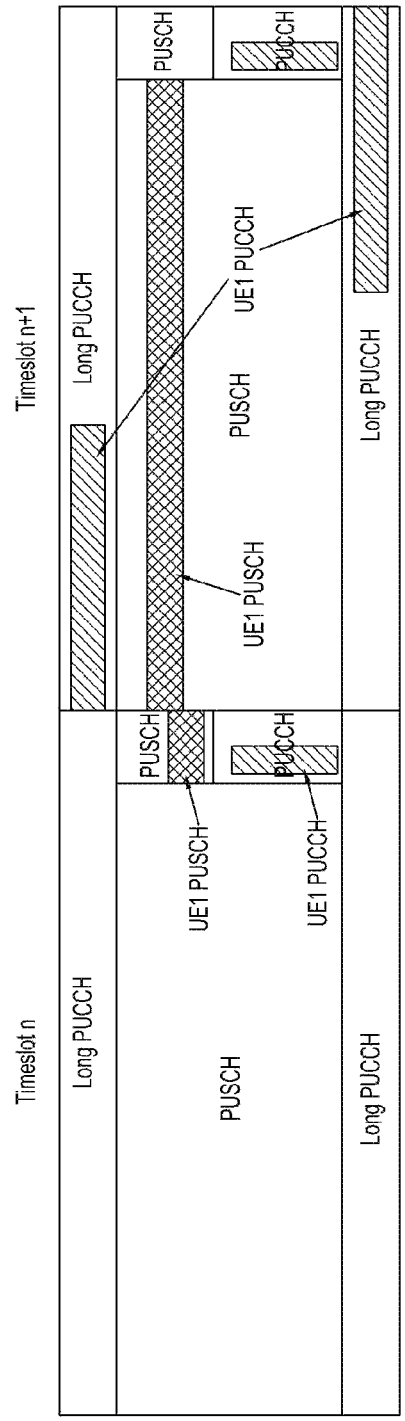
FIG. 8 is a schematic diagram showing the transmission of the second type of PUCCH or the first type of PUCCH being to be transmitted by the UE and the second type of PUCCH or the first type of PUCCH to be transmitted in the same timeslot, in which the first type of PUCCH and PUSCH are transmitted by using frequency division multiplexing and the second type of PUCCH and PUSCH are transmitted by using frequency division multiplexing, of another preferable embodiment of the present invention.

Scenario 5, as shown in FIG. 8: when the type of PUCCH to be transmitted is the first type of PUCCH or the second type of PUCCH, and the first type of PUCCH or the second type of PUCCH is to be transmitted in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, when UE is configured that the PUSCH and the first type of PUCCH are to be transmitted simultaneously in any timeslot, the type of PHR is determined as the PHR type 1 and the PHR type 2; when UE is configured that the PUSCH and the second type of PUCCH are to be transmitted simultaneously in any timeslot, the type of PHR is determined as the PHR type 1 and the PHR type 2, or the PHR type 1 and the PHR type 1 for the second type of PUCCH.

Figure 9:
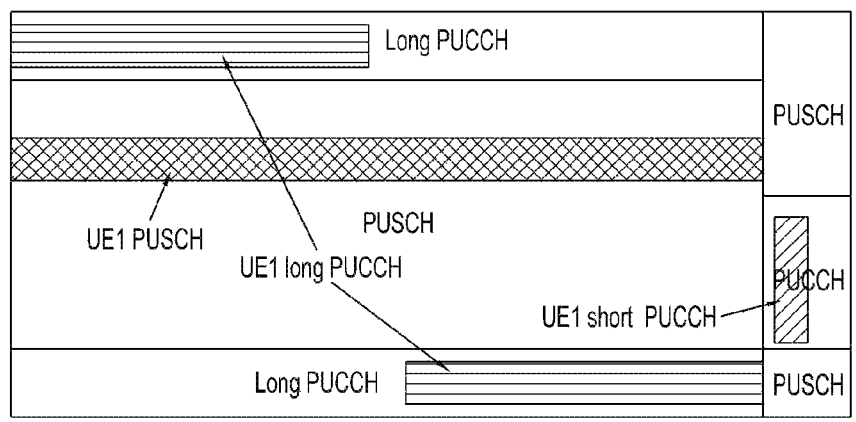
FIG. 9 is a schematic diagram showing the transmission of the second type of PUCCH and/or the first type of PUCCH to be transmitted by the UE and the second type of PUCCH and the first type of PUCCH to be transmitted simultaneously in the same timeslot, wherein, the first type of PUCCH and PUSCH are transmitted by using frequency division multiplexing and the second type of PUCCH and PUSCH are transmitted by using time division multiplexing, and the first type of PUCCH and the second type of PUCCH are not overlapped in time, of another preferable embodiment of the present invention.

Scenario 6, as shown in FIG. 9: when the type of PUCCH to be transmitted is the first type of PUCCH and/or the second type of PUCCH, and the first type of PUCCH or the second type of PUCCH are to be transmitted simultaneously in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using time division multiplexing, and the first type of PUCCH to be transmitted and the second type of PUCCH to be transmitted are not overlapped in time, when UE is configured that the PUSCH and the first type of PUCCH are to be transmitted simultaneously in any timeslot, the type of PHR is determined as the PHR type 1 and the PHR type 2; when UE is configured that the PUSCH and the second type of PUCCH are to be transmitted simultaneously in any timeslot, the type of PHR is determined as PHR type 1 and PHR type 1 for the second type of PUCCH.

Figure 10:
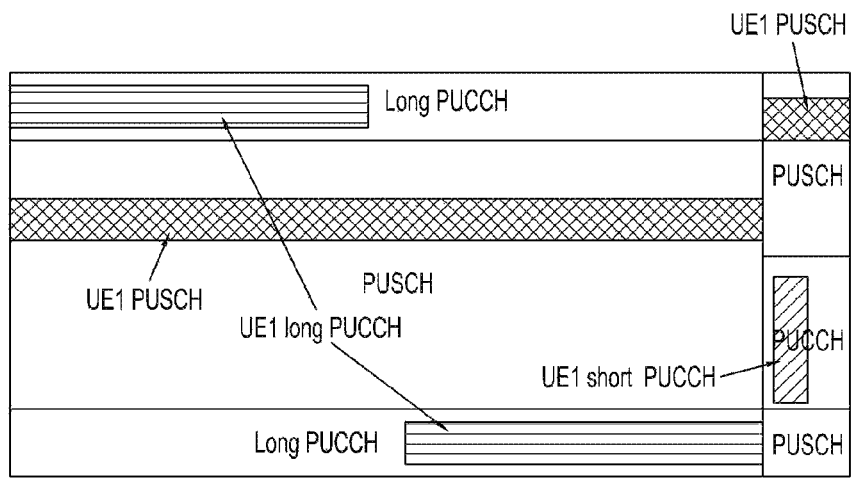
FIG. 10 is a schematic diagram showing the transmission of the second type of PUCCH and/or the first type of PUCCH to be transmitted by the UE and the second type of PUCCH and the first type of PUCCH to be transmitted in the same timeslot at the same time, wherein, the first type of PUCCH and PUSCH are transmitted by using frequency division multiplexing and the second type of PUCCH and PUSCH are transmitted by using frequency division multiplexing and the first type of PUCCH and the second type of PUCCH are not overlapped in time, of another preferable embodiment of the present invention.

Scenario 7, as shown in FIG. 10: when the type of PUCCH to be transmitted is the first type of PUCCH and/or the second type of PUCCH, and the first type of PUCCH and the second type of PUCCH are to be transmitted simultaneously in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, and the first type of PUCCH to be transmitted and the second type of PUCCH to be transmitted are not overlapped in time, when UE is configured that the PUSCH and the first type of PUCCH to be transmitted simultaneously in any timeslot, the type of PHR is determined as the PHR type 1 and PHR type 2; when UE is configured that the PUSCH and the second type of PUCCH are to be transmitted simultaneously in any timeslot, the type of PHR is determined as the PHR type 1 and the PHR type 1 for the second type of PUCCH, or the PHR type 1 and the PHR type 2.

Figure 11:
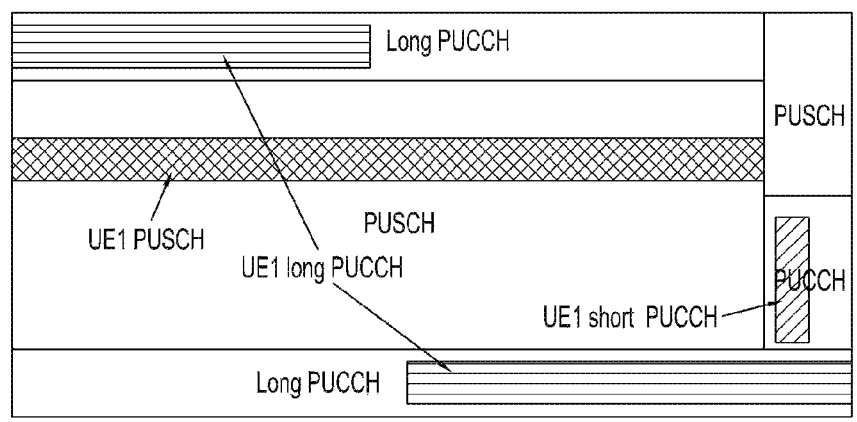
FIG. 11 is a schematic diagram showing transmission of the second type of PUCCH and/or the first type of PUCCH to be transmitted by the UE and the second type of PUCCH and the first type of PUCCH to be transmitted in the same timeslot at the same time, wherein, this first type of PUCCH and PUSCH are transmitted by using frequency division multiplexing and the second type of PUCCH and PUSCH are transmitted by using time division multiplexing and the first type of PUCCH and the second type of PUCCH are overlapped in time, of another preferable embodiment of the present invention.

Scenario 8a, as shown in FIG. 11: when the PUCCH to be transmitted is the first type of PUCCH and/or the second type of PUCCH, and the first type of PUCCH and the second type of PUCCH are to be transmitted simultaneously in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using time division multiplexing, and the first type of PUCCH to be transmitted and the second type of PUCCH to be transmitted are overlapped in time, and when the power is limited, and the power of the first type of PUCCH to be transmitted has priority, and reserved power is not set, and when UE is configured that the PUSCH and the first type of PUCCH are to be transmitted simultaneously in any timeslot, the type of PHR is determined as PHR type 1 and PHR type 2; when UE is configured that the PUSCH and the second type of PUCCH are to be transmitted simultaneously in any timeslot, the type of PHR is determined as PHR type 1 and PHR type 2 for the second type of PUCCH.

Scenario 8b, as shown in FIG. 11: when the type of PUCCH to be transmitted is the first type of PUCCH and/or the second type of PUCCH, and the first type of PUCCH and the second type of PUCCH are to be transmitted simultaneously in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using time division multiplexing, and the first type of PUCCH to be transmitted and the second type of PUCCH to be transmitted are overlapped in time, and when the power is limited, and the power of the first type of PUCCH has priority, and reserved power of the second type of PUCCH to be transmitted is set, when UE is configured that the PUSCH and the first type of PUCCH to be transmitted simultaneously in any timeslot, the type of PHR is determined as PHR type 1 and PHR type 2; when UE is configured that the PUSCH and the second type of PUCCH are to be transmitted simultaneously in any timeslot, the type of PHR is determined as PHR type 1 and PHR type 2 for the second type of PUCCH.

Figure 12:
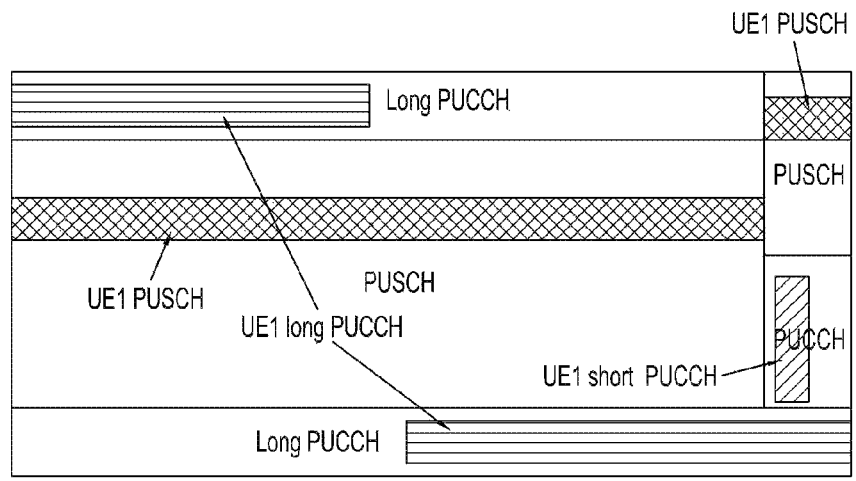
FIG. 12 is a schematic diagram showing the transmission of the second type of PUCCH and/or the first type of PUCCH to be transmitted by the UE and the second type of PUCCH and the first type PUCCH to be transmitted in the same timeslot at the same time, wherein, the first type of PUCCH and PUSCH are transmitted by using frequency division multiplexing and the second type of PUCCH and PUSCH are transmitted by using frequency division multiplexing and the first type of PUCCH and the second type of PUCCH are not overlapped in time, of another preferable embodiment of the present invention.

Scenario 9a, as shown in FIG. 12: when the type of PUCCH to be transmitted is the first type of PUCCH and/or the second type of PUCCH, and the first type of PUCCH and the second type of PUCCH are to be transmitted simultaneously in any timeslot, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, and the first type of PUCCH to be transmitted and the second type of PUCCH to be transmitted are overlapped in time, and when the power is limited, and the power of the first type of PUCCH to be transmitted has priority, and meanwhile reserved power of the second type of PUCCH is not set, and when UE is configured that the PUSCH and the first type of PUCCH are to be transmitted simultaneously in any timeslot, the type of PHR is determined as PHR type 1 and PHR type 2; when UE is configured that the PUSCH and the second type of PUCCH are to be transmitted simultaneously in any timeslot, the type of PHR is determined as PHR type 1 and PHR type 2 for the second type of PUCCH, or PHR type 1 and PHR type 2.

Scenario 9b, as shown in FIG. 12: when the PUCCH to be transmitted is the first type of PUCCH and/or the second type of PUCCH, and the first type of PUCCH and the second type of PUCCH are to be transmitted simultaneously in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, and the first type of PUCCH to be transmitted and the second type of PUCCH to be transmitted are overlapped in time, and when the power is limited, and the power of the first type of PUCCH to be transmitted has priority, and reserved power of the second type of PUCCH to be transmitted is not set, when UE is configured that the PUSCH and the first type of PUCCH are to be transmitted simultaneously in any timeslot, the type of PHR is determined as PHR type 1 and PHR type 2; when UE is configured that the PUSCH and the second type of PUCCH are to be transmitted simultaneously in any timeslot, the type of PHR is determined as PHR type 1 and PHR type 2 for the second type of PUCCH, or PHR type 1 and PHR type 2.

Step S102: the corresponding power headroom is determined based on the type of PHR, and PHR is reported.

Further illustrations for step S102 in nine scenarios are as below:

Specifically, when the type of PHR is determined as PHR type 1, the step of determining corresponding power headroom based on the type of PHR comprises: based on the situation of PUSCH to be transmitted in any timeslot, the actual transmission power of PUSCH in any timeslot is determined; based on the situation of PUSCH and PUCCH to be transmitted in any timeslot, the maximum transmission power of PUSCH in any timeslot; based on the actual transmission power of PUSCH in the any timeslot and maximum transmission power of PUSCH in the any timeslot, determining the power headroom of PHR type 1.

Based on the situation of PUSCH and PUCCH to be transmitted in any timeslot, the step of determining the maximum transmission power of PUSCH in the any timeslot comprises any one of the following situations: when PUSCH and the first type of PUCCH are to be transmitted in any timeslot at the same time, or, PUSCH and the second type of PUCCH are to be transmitted at the same time, the maximum transmission power of PUSCH in the any timeslot is determined as the maximum transmission power of PUSCH in the situation of only PUSCH to be transmitted in the any timeslot; when PUSCH is to be transmitted and the first type of PUCCH is not to be transmitted in any timeslot, or, when PUSCH is to be transmitted and the second type of PUCCH is not to be transmitted in any timeslot, the maximum transmission power of PUSCH in any timeslot is determined as the maximum transmission power in the any timeslot; when the first type of PUCCH or the second type of PUCCH is to be transmitted and the PUSCH is not to be transmitted in any timeslot, it is determined that the maximum transmission power of PUSCH in the any timeslot is the maximum transmission power of PUSCH in the any timeslot, when the conditions of Maximum Power Reduction (MPR)=0, Additional Maximum Power Reduction (A-MPR)=0, Power management MPR (P-MPR)=0 and Allowed operating band edge transmission power relaxation (ATC)=0 are met; when neither PUSCH nor the first type of PUCCH or the second type of PUCCH is to be transmitted in any timeslot, the maximum transmission power of PUSCH in any timeslot is determined as the maximum transmission power of PUSCH in the any timeslot, when the conditions of MPR=0, A-MPR=0, P-MPR=0, and ATC=0 are met.

When it is determined that the type of PHR is PHR type 2, the step of determining the corresponding power headroom based on the type of PHR comprises: based on the situation of PUSCH to be transmitted in any timeslot, the actual transmission power of PUSCH in the any timeslot is determined; based on the situation of the first type of PUCCH or the second type of PUCCH to be transmitted in any timeslot, the actual transmission power of corresponding PUCCH in the any timeslot is determined; based on the situation of the first type of PUCCH or the second type of PUCCH to be transmitted in any timeslot, the actual transmission power corresponding to the first type of PUCCH or the second type of PUCCH in the any timeslot is determined; based on the situation of PUSCH and the first type of PUCCH to be transmitted in any timeslot, the maximum transmission power in any timeslot or the maximum transmission power of PUSCH is determined; or based on the situation of PUSCH and the second type of PUCCH to be transmitted in any timeslot, the maximum transmission power in the any timeslot or the maximum transmission power of PUSCH is determined; based on the actual transmission power of PUSCH in the any timeslot, the actual transmission power of corresponding type of PUCCH in the any timeslot, and the maximum transmission power in the any timeslot or the maximum transmission power of PUSCH, the power headroom of the PHR type 2 is determined.

Based on the situations of PUSCH and the first type of PUCCH to be transmitted in any timeslot, the step of determining the maximum transmission power in the any timeslot or the maximum transmission power of PUSCH comprises: when the PUSCH and the first type of PUCCH are to be transmitted in any timeslot at the same time, or when only PUSCH is to be transmitted in any timeslot, or when only the first type of PUCCH is to be transmitted in any timeslot, the maximum transmission power in the any timeslot is determined; or neither PUSCH nor the first type of PUCCH is to be transmitted in any timeslot, the maximum transmission power of PUSCH in any timeslot is determined when the conditions of MPR=0, A-MPR=0, P-MPR=0, and ATC=0 are met.

Based on the situation of PUSCH and the second type of PUCCH to be transmitted in any timeslot, the step of determining the maximum transmission power in the any timeslot or the maximum transmission power of PUSCH comprises: when the PUSCH and the second type of PUCCH are to be transmitted in any timeslot at the same time, or when only PUSCH is to be transmitted in any timeslot, or when only the second type of PUCCH is to be transmitted in any timeslot, the maximum transmission power in the any timeslot is determined; or when neither PUSCH nor the second type of PUCCH is to be transmitted in any timeslot, the maximum transmission power of PUSCH in any timeslot is determined when the conditions of MPR=0, A-MPR=0, P-MPR=0, and ATC=0 are met.

Scenario 1: as shown in FIG. 4, when the type of PUCCH to be transmitted is the first type of PUCCH and the first type of PUCCH to be transmitted and PUSCH to be transmitted are transmitted by using frequency division multiplexing:

Case 1: when UE is configured that the first type of PUCCH and PUSCH can be transmitted in the same timeslot at the same time, and UE reports the PHR type 1 and PHR type 2 at the same time, base station can calculate the power headroom for the first type of PUCCH in different situations, according to PHR type 1 and PHR type 2.

Situation a: if UE transmits PUSCH and the first type of PUCCH simultaneously in timeslot i of serving cell c, the power headroom corresponding to PHR type 1 reported by UE is:

$$PH_{type1,c}(i) = \tilde{P}_{CMAX,c}(i) - \{10\log_{10}(M_{PUSCH,c}(i)) + P_{O\_PUSCH,c}(j) + \alpha_c(j) \cdot PL_c + \alpha_{TF,c}(i) + f_c(i)\} \quad \text{[dB] Formula 1}$$

and UE reports $\tilde{P}_{CMAX,c}(i)$ at the same time.

Wherein, $\tilde{P}_{CMAX,c}(i)$ is the maximum transmission power of PUSCH calculated on the assumption that only PUSCH is transmitted by UE in timeslot i of serving cell c, $M_{PUSCH,}$ $c(i)$ is the number of physical resource blocks (PRB) occupied by PUSCH, $P_{O\_PUSCH,c}(j)$ is the power offset value configured by high layer signaling, $\alpha_c(j)$ is the link loss, $PL_c$ is the whole or part of control compensation link loss, wherein, for the PUSCH or PUSCH re-transmission of Semi-persistent scheduling (SPS), $j=0$, for the PUSCH or PUSCH re-transmission of dynamic scheduling, $j=1$, for the PUSCH or PUSCH re-transmission of random access response (RAR) scheduling, $j=2$, $\Delta_{TF,c}(i)$ a parameter related to the Modulation and Coding Scheme (MCS) of uplink transmission. Specifically speaking, when parameter $K_s$ is equal to 1.25, $\Delta_{TF,c}(i) = 10\log_{10}((2^{BPRE \cdot K_s}-1) \cdot \beta_{offset}^{PUSCH})$; when only aperiodic channel state information (A-CSI) is transmitted and no uplink data is transmitted, $BPRE=O_{CQI}/N_{RE}$, $\beta_{offset}^{PUSCH}=\beta_{offset}^{CQI}$; when the uplink data is transmitted, $$BPRE = \sum_{r=0}^{C-1} K_r / N_{RE}, \beta_{offset}^{PUSCH} = 1;$$

C is the number of Code Blocks (CB) divided by a Transmission Block (TB), $K_r$ is the bit number of the $r^{th}$ CB, $N_{RE}$ is the total number of Resource Elements (RE) included in PUSCH channel; $f_c(i)$ is the cumulative number of closed-loop power controlling.

If UE transmits PUSCH and the first type of PUCCH in timeslot i of serving cell c at the same time, and, the power headroom corresponding to PHR type 2 reported by UE is:

Formula 2

$$PH_{type2}(i) = P_{CMAX,c}(i) - 10\log_{10}\left(\begin{array}{l} 10^{(10\log_{10}(M_{PUSCH,c}(i))+P_{0\_PUSCH,c}(j) \cdot PL_c + \Delta_{TF,c}(i)+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10} \end{array}\right) [dB],$$

and UE reports $P_{CMAX,c}(i)$ at the same time.

Wherein, $P_{CMAX,c}(i)$ is the configured maximum transmission power of UE in timeslot i of serving cell c; $P_{O\_PUCCH}$ is the power offset configured by high layer signaling, $PL_c$ is the link loss; $h(n_{CQI}, n_{HARQ}, n_{SR})$ is the power offset related to format of PUCCH and the bit number of Uplink Control Information (UCI) required to be fed back; $n_{CQI}$ is the bit number of Channel State Information (CSI) required to be fed back in timeslot i; $n_{SR}$ is the bit number of Scheduling Request (SR) required to be fed back in timeslot i, and equals to 0 or 1; $n_{HARQ}$ is the bit number of effective Hybrid Automatic Retransmission Request-Acknowledge (HARQ-ACK) required to be fed back actually in timeslot i, for example, for PUCCH format 3, when CSI is required to be fed backed, $$h(n_{CQI}, n_{HARQ}, n_{SR}) = \frac{n_{HARQ} + n_{SR} + n_{CQI} - 1}{3},$$

$\Delta_{F\_PUCCH}(F)$ $\Delta_{F\_PUCCH}(F)$ is the power offset relative to a reference format, wherein, the reference format is PUCCH format 1a in LTE system, $\Delta_{TxD}(F')$ is the parameter related to PUCCH format and whether adopting transmit diversity or not.

Base station can calculate the power headroom when only the first type of PUCCH is transmitted based on the these numerical values in above situation a and the Formula 3 below:

Formula 3

$$PH_{PUCCH}(i) = \tilde{P}_{CMAX,c}(i) - 10\log_{10}\left\{\left(\begin{array}{l} 10^{P_{CMAX,c}(i)-PH_{type2}(i)} - \\ 10^{P_{CMAX,c}(i)-PH_{type2}(i)} \end{array}\right)\right\}$$

$$= \tilde{P}_{CMAX,c}(i) - 10\log_{10}\left\{\begin{array}{l} 10^{\left(\begin{array}{c}10\log_{10}(M_{PUSCH,c}(i))+P_{0\_PUSCHc}(j)+\\ \alpha_c(j) \cdot PL_c + \Delta_{TF,c}(i)+f_c(i)\end{array}\right)/10} + \\ 10^{\left(\begin{array}{c}P_{0\_PUCCH}+PL_c+h(n_{CQI},n_{HARQ},n_{SR})+\\ \Delta_{F\_PUCCH}(F)+\Delta_{TxD}(F')+g(i)\end{array}\right)/10} - \\ 10^{\left(\begin{array}{c}10\log_{10}(M_{PUSCH,c}(i))+P_{0\_PUSCH,c}(j)+\\ \alpha_c(j) \cdot PL_c + \Delta_{TF,c}(i)+f_c(i)\end{array}\right)/10} \end{array}\right\}$$

-continued $$= \tilde{P}_{CMAX,c}(i) - 10\log_{10}\left\{10^{\left(\frac{P_{0\_PUCCH}+PL_c+h(n_{CQI},n_{HARQ},n_{SR})+}{\Delta_{F\_PUCCH}(F)+\Delta_{TxD}(F')+g(i)}\right)/10}\right\}$$

$$= \tilde{P}_{CMAX,c}(i) - \left(\frac{P_{0\_PUCCH}+PL_c+h(n_{CQI},n_{HARQ},n_{SR})+}{\Delta_{F\_PUCCH}(F)+\Delta_{TxD}(F')+g(i)}\right)[dB]$$

Wherein, $\tilde{\tilde{P}}_{CMAX,c}(i)$ is the maximum transmission power of the first type of PUCCH calculated on the assumption that UE only transmits the first type of PUCCH in timeslot i of serving cell c, and $\tilde{\tilde{P}}_{CMAX,c}(i)$ can be acquired by the two ways below:

One way: $\tilde{\tilde{P}}_{CMAX,c}(i)$ is regarded to be equal to the $\tilde{P}_{CMAX,c}(i)$ calculated on the assumption that only the PUSCH is transmitted in timeslot i, then it is unnecessary to report $\tilde{\tilde{P}}_{CMAX,c}(i)$ separately when reporting PHR type 2.

Another way: when UE reports PHR type 1, it is required to report the $\tilde{P}_{CMAX,c}(i)$ calculated in the situation of only PUSCH being transmitted in timeslot i; when UE reports PHR type 2, it is required to report the $\tilde{P}_{CMAX,c}(i)$ calculated in the situation of PUSCH and the first type of PUCCH being transmitted in timeslot i, and meanwhile report the $\tilde{\tilde{P}}_{CMAX,c}(i)$ calculated in the situation of only the first type of PUCCH being transmitted in timeslot i. Situation b: if UE transmits PUSCH rather than the first type of PUCCH in timeslot i of serving cell c, the power headroom corresponding to PHR type 1 reported by UE is:

$$PH_{type1,c}(i)=\tilde{P}_{CMAX,c}(i)-\{10\log_{10}(M_{PUSCH,c}(i))+P_{O\_PUSCH,c}(j)+\alpha_c(j)\cdot PL_c+\alpha_{TF,c}(i)+f_c(i)\} \quad [dB] \text{ Formula 4)}$$

and UE reports $P_{CMAX,c}(i)$ at the same time.

If UE transmits PUSCH rather than the first type of PUCCH in timeslot i of serving cell c, the power headroom corresponding to PHR type 2 reported by UE is:

Formula 5)

$$PH_{type2}(i) = P_{CMAX,c}(i) - 10\log_{10}\left(\frac{10^{(10\log_{10}(M_{PUSCH,c}(i))+P_{0\_PUSCH,c}(j)+\alpha_c(j)\cdot PL_c+\Delta_{TF,c}(i)+f_c(i))/10}+}{10^{(P_{0\_PUCCH}+PL_c+g(i))/10}}\right)[dB]$$

and UE reports $P_{CMAX,c}(i)$ at the same time.

Base station can calculate the power headroom when only the first type of PUCCH is transmitted based on the numerical values in above Situation b and the Formula 6 below:

$$PH_{PUCCH}(i) = \tilde{P}_{CMAX,c}(i) - 10\log_{10}\left\{\left(\frac{10^{P_{CMAX,c}(i)-PH_{type2}(i)}-}{10^{P_{CMAX,c}(i)-PH_{type1,c}(i)}}\right)\right\} \quad \text{Formula 6)}$$

$$= \tilde{P}_{CMAX,c}(i) - 10\log_{10}\left\{\begin{pmatrix}10^{\left(\frac{10\log_{10}(M_{PUSCH,c}(i))+P_{0\_PUSCH,c}(j)+}{\alpha_c(j)\cdot PL_c+\Delta_{TF,c}(i)+f_c(i)}\right)/10}\\ +10^{(P_{0\_PUCCH}+PL_c+g(i))/10} - \\ 10^{\left(\frac{10\log_{10}(M_{PUSCH,c}(i))+P_{0\_PUSCH,c}(j)+}{\alpha_c(j)\cdot PL_c+\Delta_{TF,c}(i)+f_c(i)}\right)/10}\end{pmatrix}\right\}$$

$$= \tilde{P}_{CMAX,c}(i) - 10\log_{10}\left\{10^{(P_{0\_PUCCH}+PL_c+g(i))/10}\right\}$$

$$= \tilde{P}_{CMAX,c}(i) - (P_{0\_PUCCH} + PL_c + g(i))[dB]$$

Wherein, $\tilde{P}_{CMAX,c}(i)$ is the maximum transmission power of the first type of PUCCH calculated on the assumption that UE only transmits the first type of PUCCH in timeslot i of serving cell c, wherein, $\tilde{P}_{CMAX,c}(i)$ can be acquired by the following two ways.

One way: $\tilde{P}_{CMAX,c}(i)$ is regarded to be equal to $P_{CMAX,c}(i)$ calculated on the assumption that only the PUSCH is transmitted in timeslot i, and it is unnecessary to report $\tilde{P}_{CMAX,c}(i)'$ separately when reporting PHR type 2.

Another way: when UE reports PHR type 1, it is required to report $P_{CMAX,c}(i)$ calculated in the situation of only PUSCH being transmitted in timeslot i; when UE reports PHR type 2, it is required to report $P_{CMAX,c}(i)$ calculated in the situation of PUSCH being transmitted in timeslot i, and meanwhile reports $P_{CMAX,c}(i)$ calculated in the situation of only the first type of PUCCH being transmitted in timeslot i.

Situation c: if UE transmits the first type of PUCCH rather than PUSCH in timeslot i of serving cell c, the power headroom corresponding to PHR type 1 reported by UE is:

$$PH_{type1,c}(i)=\tilde{P}_{CMAX,c}(i)"-\{P_{O\_PUSCH,c}(1)+\alpha_c(1)\cdot PL_c+f_c(i)\} \quad [dB] \text{ Formula 7)}$$

and UE reports $\tilde{P}_{CMAX,c}(i)"$ at the same time.

Wherein, $\tilde{P}_{CMAX,c}(i)"$ is the maximum transmission power of PUSCH calculated on the assumption that MPR=0 dB, A-MPR=0 dB, P-MPR=0 dB and $\Delta T_c$=0 dB.

If UE transmits the first type of PUCCH rather than PUSCH in timeslot i of serving cell c, the corresponding power headroom of PHR type 2 reported by UE is:

$$PH_{type2}(i) = P_{CMAX,c}(i) - 10\log_{10}\left(10^{(P_{0\_PUSCH,c}(1)+\alpha_c(1)\cdot PL_c+f_c(i))/10} + 10^{\left(P_{0\_PUCCH}+PL_c+h(n_{CQI},n_{HARQ},n_{SR})+\Delta_{F\_PUCCH}(F)+\Delta_{TxD}(F')+g(i)\right)/10}\right)[dB] \quad \text{Formula 8)}$$

and UE reports $P_{CMAX,c}(i)$ at the same time.

Base station can calculate the power headroom when only the first type of PUCCH is transmitted based on the numerical values in above Situation c and the Formula 9, and the power headroom is as below:

$$PH_{PUCCH}(i) = \tilde{P}_{CMAX,c}(i) - 10\log_{10}\left\{\left(10^{\tilde{P}_{CMAX,c}(i)-PH_{type2}(i)} - 10^{\tilde{P}_{CMAX,c}(i)-PH_{type1,c}(i)}\right)\right\} \quad \text{Formula 9)}$$

$$= \tilde{P}_{CMAX,c}(i) - 10\log_{10}\left\{\left(10^{(P_{0\_PUSCH,c}(1)+\alpha_c(1)\cdot PL_c+f_c(i))/10} + 10^{\left(P_{0\_PUCCH}+PL_c+h(n_{CQI},n_{HARQ},n_{SR})+\Delta_{F\_PUCCH}(F)+\Delta_{TxD}(F')+g(i)\right)/10} - 10^{(P_{0\_PUSCH,c}(1)+\alpha_c(1)\cdot PL_c+f_c(i))/10}\right)\right\}$$

$$= \tilde{P}_{CMAX,c}(i) - 10\log_{10}\left\{10^{\left(P_{0\_PUCCH}+PL_c+h(n_{CQI},n_{HARQ},n_{SR})+\Delta_{F\_PUCCH}(F)+\Delta_{TxD}(F')+g(i)\right)/10}\right\}$$

$$= \tilde{P}_{CMAX,c}(i) - \left(P_{0\_PUCCH} + PL_c + h(n_{CQI}, n_{HARQ}, n_{SR}) + \Delta_{F\_PUCCH}(F) + \Delta_{TxD}(F') + g(i)\right)[dB]$$

Situation d: if UE does not transmit the first type of PUCCH and PUSCH in timeslot i of serving cell c, the power headroom corresponding to PHR type 1 reported by UE is:

$$PH_{type1,c}(i) = \tilde{P}_{CMAX,c}(i)'' - \{P_{0\_PUSCH,c}(1)+\alpha_c(1)\cdot PL_c+f_c(i)\} \quad [dB] \text{ Formula 10)}$$

and UE reports $\tilde{P}_{CMAX,c}(i)''$ at the same time.

If UE does not transmit the first type of PUCCH and PUSCH in timeslot i of serving cell c, the power headroom corresponding to PHR type 2 reported by UE is:

$$PH_{type2}(i) = \tilde{P}_{CMAX,c}(i)'' - 10\log_{10}\left(10^{(P_{0\_PUSCH,c}(1)+\alpha_c(1)\cdot PL_c+f_c(i))/10} + 10^{(P_{0\_PUCCH}+PL_c+g(i))/10}\right)[dB] \quad \text{Formula 11)}$$

and UE reports $\tilde{P}_{CMAX,c}(i)''$ at the same time.

Base station can calculate the power headroom when only the first type of PUCCH is transmitted based on these numerical values in above Situation d and Formula 12, and the power headroom is as below:

$$PH_{PUCCH}(i) = \tilde{P}_{CMAX,c}(i) - 10\log_{10}\left\{\left(10^{\tilde{P}_{CMAX,c}(i)-PH_{type2}(i)} - 10^{\tilde{P}_{CMAX,c}(i)-PH_{type1,c}(i)}\right)\right\} \quad \text{Formula 12)}$$

$$= \tilde{P}_{CMAX,c}(i) - 10\log_{10}\left\{\left(10^{(P_{0\_PUSCH,c}(1)+\alpha_c(1)\cdot PL_c+f_c(i))/10} + 10^{(P_{0\_PUCCH}+PL_c+g(i))/10} - 10^{(P_{0\_PUSCH,c}(1)+\alpha_c(1)\cdot PL_c+f_c(i))/10}\right)\right\}$$

$$= \tilde{P}_{CMAX,c}(i) - 10\log_{10}\left\{10^{(P_{0\_PUCCH}+PL_c+g(i))/10}\right\}$$

$$= \tilde{P}_{CMAX,c}(i) - (P_{0\_PUCCH} + PL_c + g(i))[dB]$$

Case 2: when UE is not configured to transmit the first type of PUCCH and PUSCH simultaneously in the same timeslot, UE only reports PHR type 1.

It should be illustrated when UE is not configured to transmit the first type of PUCCH and PUSCH simultaneously in the same timeslot, if base station cannot calculate the power headroom for the first type of PUCCH according to the PHR type 1 reported by UE, UE needs to report PHR type 1 and PHR type 2 at the same time, then base station calculates the power headroom for the first type of PUCCH according to the method in above Case 1.

Specifically, when determining the type of PHR is PHR type 1 for the second type of PUCCH, the step of determining corresponding power headroom based on the type of PHR comprises: based on situation of only the second type of PUCCH being transmitted in any timeslot, the maximum transmission power of the second type of PUCCH in the any timeslot is determined; based on the situation of second type of PUCCH being transmitted in any timeslot, the actual transmission power of the second type of PUCCH in the any timeslot is determined; based on the maximum transmission power of the second type of PUCCH in any timeslot and the actual transmission power of the second type of PUCCH in the any timeslot, the power headroom of PHR type 1 for the second type of PUCCH is determined.

Scenario 2, as shown in FIG. 5: when the type of PUCCH to be transmitted is the second type of PUCCH, and the second type of PUCCH to be transmitted and the PUSCH to be transmitted are transmitted by time division multiplexing, the type of PHR is determined as PHR type 1 and PHR type 1 for the second type of PUCCH.

For the second type of PUCCH, the power headroom corresponding to PHR type 1 for the second type of PUCCH is reported by UE, specifically, as below:

$$PH_{PUCCH,c}(i)=P_{CMAX,c}(i)'''-(P_{O\_PUCCH}+PL_c+h(n_{CQI},n_{HARQ},n_{SR})+\Delta_{F\_PUCCH}(F)+\Delta_{TxD}(F')+g(i)) \quad [\text{dB}] \quad \text{Formula 13}$$

and UE reports $\check{P}_{CMAX,c}(i)'''$ at the same time.

Wherein, $P_{CMAX,c}(i)'''$ is the maximum transmission power of the second type of PUCCH calculated on the assumption that UE only transmits the second type of PUCCH in timeslot i of serving cell c, and the parameters of $P_{O\_PUCCH}$, $PL_c$, $h(n_{CQI},n_{HARQ},n_{SR})$, $\Delta_{F\_PUCCH}(F)$, $\Delta_{TxD}(F')$ and $g(i)$ are determined for the second type of PUCCH.

For PUSCH, the power headroom corresponding to PHR type 1 reported by UE is determined by the corresponding situation in above formulas 1), 4), 7), and 10).

It should be illustrated that in Scenario 2, UE is configured to transmit the second type of PUCCH and PUSCH in the same timeslot at the same time, and UE reports the PHR type 1 for the second type of PUCCH and PHR type 1.

Scenario 3, as shown in FIG. 6: when the type of PUCCH to be transmitted is the second type of PUCCH, and the second type of PUCCH to be transmitted and the PUSCH to be transmitted are transmitted by using frequency division multiplexing, the type of PHR is determined as PHR type 1 for the second type of PUCCH and PHR type 1, or PHR type 1 and PHR type 2.

For the second type of PUCCH, the power headroom corresponding to PHR type is determined by the two ways below:

Way 1: UE reports the PHR type 1 for the second type of PUCCH, the power headroom corresponding to the type is:

$$PH_{PUCCH,c}(i)=P_{CMAX,c}(i)'''-(P_{O\_PUCCH}+PL_c+h(n_{CQI},n_{HARQ},n_{SR})+\Delta_{F\_PUCCH}(F)+\Delta_{TxD}(F')+g(i)) \quad [\text{dB}] \quad \text{Formula 13}$$

and UE reports $P_{CMAX,c}(i)'''$ at the same time.

For PUSCH, the power headroom corresponding to PHR type 1 reported by UE is determined by the corresponding situation in above formulas 1), 4), 7), and 10).

It should be illustrated that in the Way 1 of Scenario 3, UE is configured to transmit the second type of PUCCH and PUSCH in the same timeslot at the same time, and UE reports the PHR type 1 for the second type of PUCCH and PHR type 1.

Way 2: UE reports the PHR type 1 and PHR type 2, the power headroom corresponding to the two types is determined by the corresponding situation in above formulas 1), 2), 4), 5), 7), 8), 10) and 11), at this moment, all of the parameters related to the first type of PUCCH in above formulas are replaced with the parameters related to the second type of PUCCH herein.

It should be illustrated that in Way 2 of Scenario 3, UE is configured to transmit the second type of PUCCH and PUSCH in the same timeslot at the same time, and UE reports the PHR type 1 and PHR type 2.

Scenario 4, as shown in FIG. 7: when the type of PUCCH to be transmitted is the first type of PUCCH or the second type of PUCCH, and the first type of PUCCH or the second type of PUCCH is to be transmitted in the same timeslot; the first type of PUCCH to be transmitted and the PUSCH to be transmitted are transmitted by using frequency division multiplexing, the second type of PUCCH to be transmitted and the PUSCH to be transmitted are transmitted by using time division multiplexing, the type of PHR is determined as PHR type 1 and PHR type 2; and/or PHR type 1 for the second type of PUCCH and PHR type 1.

For the first type of PUCCH, UE reports PHR type 1 and PHR type 2, the power headroom corresponding to the two types is determined by the corresponding situations in above formulas 1), 2), 4), 5), 7), 8), 10) and 11).

It should be illustrated that in Scenario 4, UE is configured to transmit the first type of PUCCH and PUSCH in the same timeslot at the same time, and UE reports the PHR type 1 and PHR type 2.

For the second type of PUCCH, the power headroom of PHR type 1 for the second type of PUCCH reported by UE is:

$$PH_{PUCCH,c}(i)=P_{CMAX,c}(i)'''-(P_{O\_PUCCH}+PL_c+h(n_{CQI},n_{HARQ},n_{SR})+\Delta_{F\_PUCCH}(F)+\Delta_{TxD}(F')+g(i)[\text{dB}] \quad \text{Formula 13}$$

and UE reports $P_{CMAX,c}(i)'''$ at the same time.

Wherein, $P_{CMAX,c}(i)'''$ is the maximum transmission power of the second type of PUCCH calculated on the assumption that UE only transmits the second type of PUCCH in timeslot i of serving cell c, wherein the parameters of $P_{O\_PUCCH}$, $PL_c$, $h(n_{CQI},n_{HARQ},n_{SR})$, $\Delta_{F\_PUCCH}(F)$, $\Delta_{TxD}(F')$ and $g(i)$ are determined for the second type of PUCCH.

For PUSCH, the power headroom corresponding to PHR type 1 reported by UE is determined by the corresponding situation in above formulas 1), 4), 7), and 10).

It should be illustrated that in Scenario 4, UE is configured to transmit the second type of PUCCH and PUSCH in the same timeslot at the same time, and UE reports the PHR type 1 for the second type of PUCCH and PHR type 1.

There are two PHRs needed to be reported at this moment, for the first type of PUCCH and the second type of PUCCH respectively.

Scenario 5, as shown in FIG. 8: when the type of PUCCH to be transmitted is the first type of PUCCH or the second type of PUCCH, and the first type of PUCCH or the second type of PUCCH is to be transmitted in the same timeslot, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, the type of PHR is determined as PHR type 1 and PHR type 2; and/or PHR type 1 and PHR type 1 for the second type of PUCCH.

For the first type of PUCCH, UE reports PHR type 1 and PHR type 2, and the power headrooms corresponding thereto are determined by the corresponding situations in above formulas 1), 2), 4), 5), 7), 8), 10) and 11).

It should be illustrated that in Scenario 5, UE is configured to transmit the first type of PUCCH and PUSCH in the same timeslot at the same time, and UE reports the PHR type 1 and PHR type 2.

For the second type of PUCCH, the power headroom corresponding to PHR type is determined by the two ways below:

Way 1: UE reports the PHR type 1 for the second type of PUCCH, and the power headroom corresponding to this type is:

$$PH_{PUCCH,c}(i) = P_{CMAX,c}(i)''' - (P_{O\_PUCCH} + PL_c + h(n_{CQI}, n_{HARQ}, n_{SR}) + \Delta_{F\_PUCCH}(F) + \Delta_{TxD}(F') + g(i)) \quad [dB] \text{ Formula 13}$$

and UE reports $P_{CMAX,c}(i)'''$ at the same time.

For PUSCH, UE reports PHR type 1, the power headroom corresponding to this type is determined by the corresponding situations in above formulas 1), 4), 7), and 10).

It is should be illustrated that in Way 1 of Case 5, UE is configured to transmit the second type of PUCCH and PUSCH in the same timeslot at the same time, and UE reports the PHR type 1 for the second type of PUCCH and PHR type 1.

Way 2: UE reports the PHR type 1 and PHR type 2, the power headrooms corresponding to the two types are determined by the corresponding situations in above formulas 1), 2), 4), 5), 7), 8), 10) and 11), at this time, and all of the parameters related to the first type of PUCCH in above formulas are replaced with the parameters related to the second type of PUCCH herein.

It should be illustrated that in Way 2 of Scenario 5, UE is configured to transmit the second type of PUCCH and PUSCH in the same timeslot at the same time, and UE reports the PHR type 1 and PHR type 2. At this time, two PHRs need to be reported at this moment, for the first type of PUCCH and the second type of PUCCH respectively.

Scenario 6, as shown in FIG. 9: when the type of PUCCH to be transmitted is the first type of PUCCH and/or the second type of PUCCH, and the first type of PUCCH and the second type of PUCCH are to be transmitted in the same timeslot at the same time, and the first type of PUCCH to be transmitted and the PUSCH to be transmitted are transmitted by using frequency division multiplexing, and the second type of PUCCH to be transmitted and the PUSCH to be transmitted are transmitted by using time division multiplexing, and the first type of PUCCH to be transmitted and the second type of PUCCH to be transmitted are not overlapped in time, the type of PHR is determined as PHR type 1 and PHR type 2; and/or PHR type 1 and PHR type 1 for the second type of PUCCH.

For the first type of PUCCH, UE reports PHR type 1 and PHR type 2, the power headrooms corresponding to the two types are determined by the corresponding situations in above formulas 1), 2), 4), 5), 7), 8), 10) and 11).

It should be illustrated that in Scenario 6, UE is configured to transmit the first type of PUCCH and PUSCH in the same timeslot at the same time, and UE reports PHR type 1 and PHR type 2.

For the second type of PUCCH, the power headroom corresponding to PHR type 1 for the second type of PUCCH reported by UE is:

$$PH_{PUCCH,c}(i) = P_{CMAX,c}(i)''' - (P_{O\_PUCCH} + PL_c + h(n_{CQI}, n_{HARQ}, n_{SR}) + \Delta_{F\_PUCCH}(F) + \Delta_{TxD}(F') + g(i)) \quad [dB] \text{ Formula 13}$$

and UE reports $P_{CMAX,c}(i)'''$ at the same time.

Wherein, $P_{CMAX,c}(i)'''$ is the maximum transmission power of the second type of PUCCH calculated on the assumption that UE only transmits the second type of PUCCH in timeslot i of serving cell c, and the parameters of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are determined for the second type of PUCCH.

For PUSCH, UE reports the power headroom corresponding to PHR type 1 which is determined by the corresponding situations in above formulas 1), 4), 7), and 10).

It should be illustrated that in Scenario 6, UE is configured to transmit the second type of PUCCH and PUSCH in the same timeslot at the same time, and UE reports PHR type 1 for the second type of PUCCH and PHR type 1.

There are two PHRs needed to be reported at this time, for the first type of PUCCH and the second type of PUCCH respectively.

Scenario 7, as shown in FIG. 10: when the type of PUCCH to be transmitted is the first type of PUCCH and/or the second type of PUCCH, and the first type of PUCCH and the second type of PUCCH are to be transmitted in the same timeslot at the same time, and the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, and the first type of PUCCH to be transmitted and the second type of PUCCH to be transmitted are not overlapped in time, the type of PHR is determined as PHR type 1 and PHR type 2; and/or PHR type 1 and PHR type 1 for the second type of PUCCH.

For the first type of PUCCH, UE reports PHR type 1 and PHR type 2, the PHRs corresponding to the two types are determined by the corresponding situations in above formulas 1), 2), 4), 5), 7), 8), 10) and 11).

It should be illustrated that in scenario 7, UE is configured to transmit the first type of PUCCH and PUSCH in the same timeslot at the same time, and UE reports PHR type 1 and PHR type 2.

For the second type of PUCCH, the power headroom corresponding to the PHR type is determined by the two ways below:

Way 1: UE reports the PHR type 1 for the second type of PUCCH, and the power headroom corresponding to this type is:

$$PH_{PUCCH,c}(i) = P_{CMAX,c}(i)''' - (P_{O\_PUCCH} + PL_c + h(n_{CQI}, n_{HARQ}, n_{SR}) + \Delta_{F\_PUCCH}(F) + \Delta_{TxD}(F') + g(i)) \quad [dB] \text{ Formula 13}$$

and UE reports $P_{CMAX,c}(i)'''$ at the same time.

For PUSCH, UE reports PHR type 1, the power headroom corresponding to this type is determined by the corresponding situation in above formulas 1), 4), 7), and 10).

It should be illustrated that in Way 1 of Scenario 7, UE is configured to transmit the second type of PUCCH and PUSCH in the same timeslot at the same time, and UE reports the PHR type 1 for the second type of PUCCH and PHR type 1.

Way 2: UE reports the PHR type 1 and PHR type 2, the power headroom corresponding to the two types are determined by the corresponding situations in above formulas 1), 2), 4), 5), 7), 8), 10) and 11), at this time, all of the parameters related to the first type of PUCCH in above formulas are replaced with the parameters related to the second type of PUCCH herein.

It should be illustrated that in the Way 2 of Scenario 7, UE is configured to transmit the first type of PUCCH and PUSCH in the same timeslot at the same time, and UE reports the PHR type 1 and PHR type 2.

There are two PHRs needed to be reported at this time, for the first type of PUCCH and the second type of PUCCH respectively.

Specifically, when the type of PHR is PHR type 2 for the second type of PUCCH is determined, the step of determining corresponding power headroom based on the type of PHR comprises: based on the situation of the first type of PUCCH being transmitted and the second type of PUCCH being transmitted in any timeslot, the maximum transmission power of the second type of PUCCH in any timeslot is determined; based on the maximum transmission power of the second type of PUCCH in the any timeslot, the type of PUCCH to be transmitted and limiting power condition corresponding to the type to be transmitted, the maximum value of the maximum transmission power of the second type of PUCCH without comprising corresponding limiting power in the any timeslot; based on the situation of the second type of PUCCH to be transmitted in any timeslot, the actual transmission power of the second type of PUCCH in any timeslot is determined; based on the maximum value of the maximum transmission power of the second type of PUCCH without comprising corresponding limiting power in any timeslot and the actual transmission power of the second type of PUCCH in the any timeslot, the power headroom of PHR type 2 for the second type of PUCCH is determined.

Scenario 8a, as shown in FIG. 11: when the type of PUCCH to be transmitted is the first type of PUCCH and/or the second type of PUCCH, and the first type of PUCCH and the second type of PUCCH are to be transmitted in the same timeslot at the same time, and the first type of PUCCH to be transmitted and the PUSCH to be transmitted are transmitted by using frequency division multiplexing, and the second type of PUCCH to be transmitted and the PUSCH to be transmitted are transmitted by using time division multiplexing, and the first type of PUCCH to be transmitted and the second type of PUCCH to be transmitted are overlapped in time, and when the power is limited, and the power of the first type of PUCCH has priority, and reserved power is not set, the type of power headroom is determined as PHR type 1 and PHR type 2; and/or PHR type 1 and PHR type 2 for the second type of PUCCH.

For the first type of PUCCH, UE reports PHR type 1 and PHR type 2, the power headrooms corresponding to the two types are determined by the corresponding situations in above formulas 1), 2), 4), 5), 7), 8), 10) and 11).

It should be illustrated that in Scenario 8a, UE is configured to transmit the first type of PUCCH and PUSCH in the same timeslot at the same time, and UE reports PHR type 1 and PHR type 2.

For the second type of PUCCH, UE reports PHR type 2 for the second type of PUCCH, the power headroom corresponding thereto is:

$$PH_{PUCCH,c}(i) = P_{CMAX,c}(i)'''' - P_{Long\_PUCCH} - \\ (P_{O\_PUCCH} + PL_c + h(n_{CQI}, n_{HARQ}, n_{SR}) + \Delta_{F\_PUCCH} \\ (F) + \Delta_{TxD}(F') + g(i)) \quad [dB] \text{ Formula 14}$$

and UE reports $P_{CMAX,c}(i)''''$ at the same time.

Wherein, $P_{CMAX,c}(i)''''$ is the maximum transmission power of the second type of PUCCH calculated on the assumption that UE transmits the first type of PUCCH and the second type of PUCCH in timeslot i of serving cell c. Wherein, $P_{Long\_PUCCH}$ is the power of the first type of PUCCH having a priority, and the parameters of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are determined for the second type of PUCCH.

It should be illustrated that in Scenario 8a, UE is configured to transmit the second type of PUCCH and PUSCH in the same timeslot at the same time, and UE reports PHR type 1 and PHR type 2 for the second type of PUCCH.

Specifically, the step of determining corresponding power headroom based on the type of PHR comprises: based on the type of PUCCH to be transmitted and the corresponding limiting power condition of preset reserved power of the type of PUCCH to be transmitted, for the first type of PUCCH to be transmitted, the maximum transmission power in the any timeslot is modified into the maximum transmission power without corresponding limiting power in the any timeslot; based on the actual transmission power of PUSCH in the any timeslot and the maximum transmission power without corresponding limiting power in the any timeslot, the power headroom of PHR type 1 for the first type of PUCCH to be transmitted and the power headroom of the PHR type 2 are determined.

Specifically, with respect to the PHR type 2 for the second type of PUCCH, based on the maximum transmission power of the second type of PUCCH in any timeslot, the type of PUCCH to be transmitted and the corresponding limiting power condition of the type to be transmitted, the step of determining the maximum value of the maximum transmission power of the second type of PUCCH without corresponding limiting power in any timeslot comprises: when the corresponding limiting power condition is that, when the power is limited, and the power of the first type of PUCCH to be transmitted has a priority, and meanwhile the reserved power of the second type of PUCCH to be transmitted is not set, the maximum value of the maximum transmission power of the second type of PUCCH without corresponding limiting power in the any timeslot is the difference value between the maximum transmission power of the second type of PUCCH and the power of the first type of PUCCH to be transmitted in the any timeslot; when the corresponding limiting power condition is that, when the power is limited, and the power of the first type of PUCCH to be transmitted has a priority, and meanwhile the reserved power of the second type of PUCCH to be transmitted is set, it is determined that the maximum value of the maximum transmission power of the second type of PUCCH without corresponding limiting power in the any timeslot is the maximum value between the difference value between the maximum transmission power of the second type of PUCCH and the power of the first type of PUCCH to be transmitted in the any timeslot, and the reserved power of the second type of PUCCH.

Scenario 8b, as shown in FIG. 11: when the type of PUCCH to be transmitted is the first type of PUCCH and/or the second type of PUCCH, and the first type of PUCCH and the second type of PUCCH are to be transmitted in the same timeslot at the same time; the first type of PUCCH to be transmitted and the PUSCH to be transmitted are transmitted by using frequency division multiplexing, the second type of PUCCH to be transmitted and the PUSCH to be transmitted are transmitted by using time division multiplexing, and the first type of PUCCH to be transmitted and the second type of PUCCH to be transmitted are overlapped in time, and when the power is limited, the power of the first type of PUCCH has a priority, and the reserved power of the second type of PUCCH to be transmitted is set, the type of PHR is determined as PHR type 1 and PHR type 2; and/or PHR type 1 and PHR type 2 for the second type of PUCCH.

For the first type of PUCCH, UE reports PHR type 1 and PHR type 2, the power headrooms corresponding to the two types are determined by the corresponding situations in above formulas 1), 2), 4), 5), 7), 8), 10) and 11), wherein, the maximum power $P_{CMAX,c}(i)$ is replaced with $P_{CMAX,c}(i) - P_{Reserved,c}(i)$, which is the difference value between the maximum power $P_{CMAX,c}(i)$ and the reserved power of the second type of PUCCH.

It should be illustrated that in Scenario 8b, UE is configured to transmit the first type of PUCCH and PUSCH in the same timeslot at the same time, and UE reports PHR type 1 and PHR type 2.

For the second type of PUCCH, UE reports PHR type 2 for the second type of PUCCH, the power headroom corresponding to this type is:

$$PH_{PUCCH,c}(i) = \max\{(P_{CMAX,c}(i)'''' - P_{Long\_PUCCH}), P_{C\_Reserved,c}(i)\} - (P_{O\_PUCCH} + PL_c + h(n_{CQI}, n_{HARQ}, n_{SR}) + \Delta_{F\_PUCCH}(F) + \Delta_{TxD}(F') + g(i))$$ [dB] Formula 15)

and $P_{CMAX,c}(i)''''$ is reported at the same time.

Wherein, the parameters of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are determined for the second type of PUCCH.

It should be illustrated that in Scenario 8b, UE is configured to transmit the second type of PUCCH and PUSCH in the same timeslot at the same time, and UE reports PHR type 1 and PHR type 2 for the second type of PUCCH.

Specifically, the step of determining corresponding power headroom based on the type of PHR also comprises: based on the type of PUCCH to be transmitted and the corresponding limiting power condition of the type of PUCCH to be transmitted, for the second type of PUCCH to be transmitted, the maximum transmission power in the any timeslot is modified as the maximum value between the maximum transmission power without corresponding limiting power in the any timeslot and the preset reserved power in the any timeslot; based on the actual transmission power of PUSCH in the any timeslot, the actual transmission power of PUCCH of corresponding type in the any timeslot and the maximum value between the maximum transmission power without corresponding limiting power in the any timeslot and the preset served power in the any timeslot, the power headroom of PHR type 1 for the second type of PUCCH to be transmitted and the power headroom of the PHR type 2 are determined.

Based on the type of PUCCH to be transmitted and the corresponding limiting power condition of the type of PUCCH to be transmitted, for the second type of PUCCH to be transmitted, the step of modifying the maximum transmission power in the any timeslot as the maximum value between the maximum transmission power without corresponding limiting power in any timeslot and the preset reserved power in any timeslot comprises: when the corresponding limiting power condition is that, when the power is limited, and the power of the first type of PUCCH to be transmitted has a priority, and meanwhile reserved power of the second type of PUCCH to be transmitted is not set, the maximum transmission power in any timeslot is modified as the difference value between the maximum transmission power in any timeslot and the power of the first type of PUCCH to be transmitted having a priority; when the corresponding limiting power condition is that, when the power is limited, and the power of the first type of PUCCH to be transmitted has a priority, and meanwhile the reserved power of the second type of PUCCH to be transmitted is set, the maximum transmission power in any timeslot is modified as the maximum value between the difference value between the maximum transmission power in the any timeslot and the power of the first type of PUCCH to be transmitted having a priority, and the reserved power of the second type of PUCCH to be transmitted.

Scenario 9a, as shown in FIG. 12: when the type of PUCCH to be transmitted is the first type of PUCCH and/or the second type of PUCCH, and the first type of PUCCH and the second type of PUCCH are to be transmitted in the same timeslot at the same time; the first type of PUCCH to be transmitted and the PUSCH to be transmitted are transmitted by using frequency division multiplexing, the second type of PUCCH to be transmitted and the PUSCH to be transmitted are transmitted by using frequency division multiplexing, and the first type of PUCCH to be transmitted and the second type of PUCCH to be transmitted are overlapped in time, and when the power is limited, and the power of the first type of PUCCH has priority, and meanwhile the reserved power of the second type of PUCCH to be transmitted is not set, the type of PHR is determined as PHR type 1 and PHR type 2; and/or PHR type 1 and PHR type 2 for the second type of PUCCH.

For the first type of PUCCH, UE reports PHR type 1 and PHR type 2, the power headrooms corresponding to the two types is determined by the corresponding situations in above formulas 1), 2), 4), 5), 7), 8), 10) and 11).

It should be illustrated that in Scenario 9a, UE is configured to transmit the first type of PUCCH and PUSCH in the same timeslot at the same time, and UE reports PHR type 1 and PHR type 2.

For the second type of PUCCH, the PHR corresponding to the type of PHR is determined by the two ways as below:

Way 1: UE reports PHR type 2 for the second type of PUCCH, the power headroom corresponding to this type is:

$$PH_{PUCCH,c}(i) = P_{CMAX,c}(i)'''' - P_{Long\_PUCCH} - (P_{O\_PUCCH} + PL_c + h(n_{CQI}, n_{HARQ}, n_{SR}) + \Delta_{F\_PUCCH}(F) + \Delta_{TxD}(F') + g(i))$$ [dB] Formula 14)

and UE reports $P_{CMAX,c}(i)''''$ at the same time.

Wherein, $P_{CMAX,c}(i)''''$ is the maximum transmission power of the second type of PUCCH calculated on the assumption that UE transmits the first type of PUCCH and the second type of PUCCH in timeslot i of serving cell c. Wherein, $P_{Long\_PUCCH}$ is the power of the first type of PUCCH having a priority, these parameters of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are determined for the second type of PUCCH.

It should be illustrated that in Scenario 9a, UE is configured to transmit the second type of PUCCH and PUSCH in the same timeslot at the same time, and UE reports PHR type 1 and PHR type 2 for the second type of PUCCH.

Way 2: UE reports the PHR type 1 and PHR type 2, the power headrooms corresponding to the two types are determined by the corresponding situations in above formulas 1), 2), 4), 5), 7), 8), 10) and 11), at this time, all of the parameters related to the first type of PUCCH in above formulas are replaced with the parameters related to the second type of PUCCH herein, and the maximum power $P_{CMAX,c}(i)$ was replaced with $P_{CMAX,c}(i) - P_{Long\_PUCCH}'$.

It should be illustrated that in Scenario 9a, UE is configured to transmit the second type of PUCCH and PUSCH in the same timeslot at the same time, and UE reports the PHR type 1 and PHR type 2.

Scenario 9b, as shown in FIG. 12: when the type of PUCCH to be transmitted is the first type of PUCCH and/or the second type of PUCCH, and the first type of PUCCH and the second type of PUCCH are to be transmitted in the same timeslot at the same time; the first type of PUCCH to be transmitted and the PUSCH to be transmitted are transmitted by using frequency division multiplexing, and the second type of PUCCH to be transmitted and the PUSCH to be transmitted are transmitted by using frequency division multiplexing, and the first type of PUCCH to be transmitted and the second type of PUCCH to be transmitted are overlapped in time, and when the power is limited, and the power of the first type of PUCCH has a priority, and the reserved power of the second type of PUCCH to be transmitted is set, the type of PHR is determined as PHR type 1 and PHR type 2; and/or PHR type 1 and PHR type 2 for the second type of PUCCH.

For the first type of PUCCH, UE reports PHR type 1 and PHR type 2, the power headrooms corresponding to the two types are determined by the corresponding situations in above formulas 1), 2), 4), 5), 7), 8), 10) and 11), and the maximum power $P_{CMAX,c}(i)$ is replaced with $P_{CMAX,c}(i) - P_{C\_Reserved,c}(i)$.

It should be illustrated that in Scenario 9b, UE is configured to transmit the first type of PUCCH and PUSCH in the same timeslot at the same time, and UE reports the PHR type 1 and PHR type 2.

For the second type of PUCCH, the power headroom corresponding to type of PHR is determined by the two ways as below:

Way 1: for the second type of PUCCH, UE reports PHR type 2 for the second type of PUCCH, the power headroom corresponding to this type is:

$$PH_{PUCCH,c}(i) = \max\{(P_{CMAX,c}(i)''''-P_{Long\_PUCCH}), P_{C\_Reserved,c}(i)\} - (P_{O\_PUCCH}+PL_c+h(n_{CQI}, n_{HARQ}, n_{SR})+\Delta_{F\_PUCCH}(F)+\Delta_{TxD}(F')+g(i)) \quad \text{[dB] Formula 15}$$

and $P_{CMAX,c}(i)''''$ is reported at the same time.

Wherein, the parameters of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are determined for the second type of PUCCH.

It should be illustrated that in Way 1 of Scenario 9b, UE is configured to transmit the second type of PUCCH and PUSCH in the same timeslot at the same time, and UE reports PHR type 1 and PHR type 2 for the second type of PUCCH.

Way 2: UE reports the PHR type 1 and PHR type 2, the power headrooms corresponding to the two types are determined by the corresponding situations in above formulas 1), 2), 4), 5), 7), 8), 10) and 11), at this time, all of the parameters related to the first type of PUCCH in above formulas are replaced with the parameters related to the second type of PUCCH herein, and the maximum power $P_{CMAX,c}(i)$ is replaced with max $$\{(P_{CMAX,c}(i)-P_{Long\_PUCCH}), P_{C\_Reserved,c}\}.$$

It should be illustrated that in Way 2 of Scenario 9b, UE is configured to transmit the second type of PUCCH and PUSCH in the same timeslot at the same time, and UE reports the PHR type 1 and PHR type 2.

It should be illustrated that the channel type unmentioned in channel transmission type in each scenario is regarded as there is no transmission in the channel type.

Figure 13:
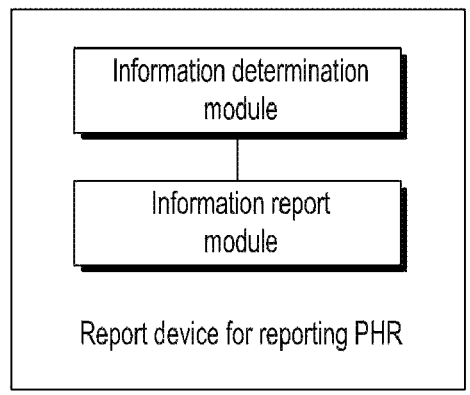
FIG. 13 is a schematic diagram of structural framework of a device for reporting PHR of another preferable embodiment of the present invention.

FIG. 13 is a schematic diagram of structural framework of report device for reporting the power headroom of another embodiment of the present invention.

The report device comprises an information determination module and an information report module; wherein, the information determination module is configured to, based on the type of PUCCH to be transmitted, determine the type of PHR; an information report module, is configured to, based on the type of PHR, determine corresponding power headroom, and report PHR.

It should be understood by those skilled in the art that the present invention involves devices for carrying out one or more of operations as described in the present invention. Those devices can be specially designed and manufactured as intended, or can comprise well known devices in a general-purpose computer. These devices have computer programs stored therein, which are selectively activated or reconfigured. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It can be understood for those skilled in the art that each block of the structure charts and/or block diagrams and/or flowchart illustrations, and combinations of blocks in the structure charts and/or block diagrams and/or flowchart illustrations, can be implemented by computer program instructions. It can be understood for those skilled in the art that the computer program instructions may also be supplied to a general purpose computer, a special purpose computer or other processor capable of programming data processing method for implementation, such that schemes specified in one or more block of the structure charts and/or block diagrams and/or flowchart illustrations are implemented by a computer or other processor capable of programming data processing method.

It can be understood for those skilled in the art that various operations, methods, steps in a flow, measures and schemes that have been discussed in the present invention may be alternated, changed, combined or deleted. In addition, those with various operations, methods, steps in a flow, measures and schemes that have been discussed in the present invention may further be alternated, changed, rearranged, disintegrated, combined or deleted. In addition, in the prior art, those with various operations, methods, steps in a flow, measures and schemes that discussed by the present invention may further be alternated, changed, rearranged, disintegrated, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method for reporting a power headroom report (PHR), the method comprising:
   determining, by a user equipment (UE), a type of the PHR, based on a type of physical uplink control channel (PUCCH) to be transmitted;
   determining, by the UE, a corresponding power headroom based on the determined type of the PHR; and
   transmitting, by the UE, the PHR including the determined power headroom to a base station, wherein the type of PUCCH is classified into a first type of PUCCH and a second type of PUCCH, wherein the first type of PUCCH includes first orthogonal frequency division multiplexing (OFDM) symbols which are more than a preset value, and the second type of PUCCH includes second OFDM symbols which are less than or equal to the preset value, and wherein determining the corresponding power headroom based on the determined type of the PHR comprises:
modifying a maximum transmission power in any timeslot as the maximum transmission power without corresponding limiting power in the any timeslot based on the determined type of PUCCH to be transmitted and a corresponding limiting power condition of preset reserved power of the first type of PUCCH to be transmitted; and
determining a power headroom of PHR type 1 for the first type of PUCCH to be transmitted and a power headroom of PHR type 2 based on an actual transmission power of PUSCH in the any timeslot and the maximum transmission power without corresponding limiting power in the any timeslot.

2. The method of claim 1, wherein the type of the PHR comprises at least one of:
a PHR type 1, a PHR type 2, a PHR type 1 for the second type of PUCCH or a PHR type 2 for the second type of PUCCH.

3. The method of claim 2, wherein determining the type of PHR based on the type of PUCCH to be transmitted comprises:
if a physical uplink shared channel (PUSCH) and the first type of PUCCH are configured to be transmitted simultaneously in any timeslot, determining that the type of the PHR includes at least one combination of:
the PHR type 1 and the PHR type 2;
the PHR type 1 and the PHR type 1 for the second type of PUCCH; or
the PHR type 1 and the PHR type 2 for the second type of PUCCH, and
if the PUSCH and the second type of PUCCH are configured to be transmitted simultaneously in any timeslot, determining that the type of the PHR includes at least one combination of:
the PHR type 1 and the PHR type 2;
the PHR type 1 and the PHR type 1 for the second type of PUCCH; or
the PHR type 1 and the PHR type 2 for the second type of PUCCH.

4. The method of claim 2, wherein, when the type of PUCCH to be transmitted is the first type of PUCCH, and the first type of PUCCH to be transmitted and a physical uplink shared channel (PUSCH) to be transmitted are transmitted by using frequency division multiplexing, the type of PHR is determined as:
the PHR type 1 in case that the UE is not configured that the PUSCH and the first type of PUCCH are to be transmitted simultaneously in a timeslot, or the PHR type 1 and the PHR type 2 in case that the UE is configured that the PUSCH and the first type of PUCCH are to be transmitted simultaneously in the timeslot.

5. The method of claim 3, wherein determining the corresponding power headroom based on the type of the PHR when the type of the PHR is determined as the PHR type 1 comprises:

determining an actual transmission power of PUSCH in the any timeslot based on the PUSCH being transmitted in any timeslot;
determining a maximum transmission power of PUSCH in the any timeslot based on the PUSCH and the PUCCH being transmitted in any timeslot; and
determining the corresponding power headroom based on the determined type of the PHR being the PHR type 1, and in combination with the actual transmission power of PUSCH in the any timeslot and the maximum transmission power of the PUSCH in the any timeslot.

6. The method of claim 3, wherein determining the corresponding power headroom based on the type of the PHR when the type of the PHR is determined as PHR type 2 comprises:
determining an actual transmission power of PUSCH in the any timeslot based on the PUSCH being transmitted in any timeslot;
determining an actual transmission power corresponding to the first type of PUCCH or the second type of PUCCH in the any timeslot based on the first type of PUCCH or the second type of PUCCH being transmitted in any timeslot;
determining a maximum transmission power or a maximum transmission power of PUSCH in any timeslot based on the PUSCH or the first type of PUCCH being transmitted in any timeslot, or determining the maximum transmission power or the maximum transmission power of PUSCH in any timeslot based on the PUSCH and the second type of PUCCH being transmitted in any timeslot; and
determining the corresponding power headroom based on the type of the PHR is determined as the PHR type 2 and in combination with the actual transmission power of PUSCH in any timeslot, the actual transmission power corresponding to the first type of PUCCH or the second type of PUCCH in any timeslot, the maximum transmission power or the maximum transmission power of PUSCH in the any timeslot.

7. The method of claim 6, wherein determining the maximum transmission power in the any timeslot or the maximum transmission power of PUSCH based on the PUSCH and the first type of PUCCH being transmitted in any timeslot comprises:
when the PUSCH and the first type of PUCCH are to be transmitted in any timeslot at a same time, or when only the PUSCH is to be transmitted in any timeslot, or when only the first type of PUCCH is to be transmitted in any timeslot, determining the maximum transmission power in the any timeslot; or
when neither the PUSCH nor the first type of PUCCH is to be transmitted in the any timeslot, and when MPR=0, A-MPR=0, P-MPR=0, ΔTc=0, determining the maximum transmission power of PUSCH in the any timeslot.

8. The method of claim 6, wherein determining the maximum transmission power in the any timeslot or the maximum transmission power of PUSCH based on the PUSCH and the second type of PUCCH being transmitted in any timeslot comprises:
when the PUSCH and the second type of PUCCH are to be transmitted simultaneously in any timeslot, or when only the PUSCH is to be transmitted in any timeslot, or when only the second type of PUCCH is to be transmitted in any timeslot, determining the maximum transmission power in the any timeslot; or when neither PUSCH nor the second type of PUCCH is to be transmitted, and when MPR=0, A-MPR=0, P-MPR=0, ΔTc=0, determining the maximum transmission power of PUSCH in the any timeslot.

9. The method of claim 2, wherein determining the corresponding power headroom based on the type of the PHR comprises:
  modifying a maximum transmission power in any timeslot as a maximum value between the maximum transmission power without corresponding limiting power in the any timeslot and a preset reserved power in the any timeslot based on the type of PUCCH to be transmitted and corresponding limiting power condition thereof, with respect to the second type of PUCCH to be transmitted; and
  determining a power headroom of PHR type 1 for the second type of PUCCH to be transmitted and a power headroom of PHR type 2 based on an actual transmission power of a Physical Uplink Shared Channel (PUSCH) in the any timeslot, the actual transmission power of corresponding type PUCCH in the any timeslot and the maximum value between the maximum transmission power without corresponding limiting power and the preset reserved power in the any timeslot.

10. The method of claim 9, wherein modifying the maximum transmission power in the any timeslot as the maximum value between the maximum transmission power without corresponding limiting power in the any timeslot and the preset reserved power in the any timeslot based on the type of PUCCH to be transmitted and corresponding limiting power condition thereof, with respect to the second type of PUCCH to be transmitted comprises:
  when the corresponding limiting power condition is that, when the power is limited, the power of the first type of PUCCH to be transmitted has a priority, and meanwhile reserved power of the second type of PUCCH to be transmitted is not set, modifying the maximum transmission power in the any timeslot as a difference value between the maximum transmission power in the any timeslot and the power of the first type of PUCCH to be transmitted having a priority; or
  when the corresponding limiting condition is that, when the power is limited, the power of the first type of PUCCH to be transmitted has a priority, and meanwhile reserved power of the second type of PUCCH to be transmitted is not set, modifying the maximum transmission power in the any timeslot as a maximum value between the difference value between the maximum transmission power in the any timeslot and the power of the first type of PUCCH to be transmitted having the priority, and the reserved power of the second type of PUCCH to be transmitted.

11. The method of claim 3, wherein determining the corresponding power headroom based on the type of PHR when the type of PHR is determined as the PHR type 1 for the second type of PUCCH comprises:
  determining a maximum transmission power of the second type of PUCCH in the any timeslot based on only the second type of PUCCH being transmitted in any timeslot;
  determining an actual transmission power of the second type of PUCCH in the any timeslot based on only the second type of PUCCH being transmitted in any timeslot; and
  determining the power headroom of the PHR type 1 for the second type of PUCCH based on the determined type of PHR is the PHR type 1 for the second type of PUCCH, and in combination with the maximum transmission power of the second type of PUCCH in the any timeslot and the actual transmission power of the second type of PUCCH in the any timeslot.

12. The method of claim 3, wherein determining the corresponding power headroom based on the type of PHR when the determined type of PHR is the PHR type 2 for the second type of PUCCH comprises:
  determining a maximum transmission power of the second type of PUCCH in the any timeslot in the first type of PUCCH and the second type of PUCCH to be transmitted;
  determining a maximum value of the maximum transmission power of the second type of PUCCH without the corresponding limiting power in the any timeslot based on the maximum transmission power of the second type of PUCCH in the any timeslot, the type of PUCCH to be transmitted and the corresponding limiting power condition thereof;
  determining a actual transmission power of the second type of PUCCH in the any timeslot based on the second type of PUCCH being transmitted; and
  determining the power headroom of the PHR type 2 for the second type of PUCCH based on the determined type of PHR being the PHR type 2 for the second PUCCH, and in combination with the maximum value of the maximum transmission power of the second type of PUCCH without the corresponding limiting power in the any timeslot and the actual transmission power of the second type of PUCCH in the any timeslot.

13. A device in a user equipment (UE) for reporting a power headroom report (PHR), the device comprising:
  a processor configured to:
    determine a type of the PHR based on a type of physical uplink control channel (PUCCH) to be transmitted;
    determine a corresponding power headroom based on the determined type of the PHR; and
    transmit the PHR including the determined power headroom to a base station
  wherein the type of PUCCH is classified into a first type of PUCCH and a second type of PUCCH,
  wherein the first type of PUCCH includes first orthogonal frequency division multiplexing (OFDM) symbols which are more than a preset value, and the second type of PUCCH includes second OFDM symbols which are less than or equal to the preset value, and
  wherein the processor is further configured to:
    modify a maximum transmission power in any timeslot as the maximum transmission power without corresponding limiting power in the any timeslot based on the type of PUCCH to be transmitted and a corresponding limiting power condition of preset reserved power of the first type of PUCCH to be transmitted, and
    determine a power headroom of PHR type 1 for the first type of PUCCH to be transmitted and a power headroom of PHR type 2 based on an actual transmission power of PUSCH in the any timeslot and the maximum transmission power without corresponding limiting power in the any timeslot.

14. The device of claim 13, wherein the type of the PHR comprises at least one of:
  a PHR type 1, a PHR type 2, a PHR type 1 for the second type of PUCCH or a PHR type 2 for the second type of PUCCH.

15. The device of claim 14, wherein the processor is further configured to:
- if a Physical Uplink Shared Channel (PUSCH) and the first type of PUCCH are configured to be transmitted simultaneously in any timeslot, determine that the type of the PHR includes at least one combination of:
- the PHR type 1 and the PHR type 2;
- the PHR type 1 and the PHR type 1 for the second type of PUCCH; or
- the PHR type 1 and the PHR type 2 for the second type of PUCCH, and if the PUSCH and the second type of PUCCH are configured to be transmitted simultaneously in any timeslot, determine that the type of the PHR includes at least one combination of:
- the PHR type 1 and the PHR type 2;
- the PHR type 1 and the PHR type 1 for the second type of PUCCH; or
- the PHR type 1 and the PHR type 2 for the second type of PUCCH.

16. The device of claim 14, wherein, when the type of PUCCH to be transmitted is the first type of PUCCH, and the first type of PUCCH to be transmitted and a physical uplink shared channel (PUSCH) to be transmitted are transmitted by using frequency division multiplexing, the type of PHR is determined as:
- the PHR type 1 in case that the UE is not configured that the PUSCH and the first type of PUCCH are to be transmitted simultaneously in a timeslot, or the PHR type 1 and the PHR type 2 in case that the UE is configured that the PUSCH and the first type of PUCCH are to be transmitted simultaneously in the timeslot.

17. The device of claim 15, wherein the processor is further configured to:
- determine an actual transmission power of PUSCH in the any timeslot based on the PUSCH being transmitted in any timeslot;
- determine a maximum transmission power of PUSCH in the any timeslot based on the PUSCH and the PUCCH being transmitted in any timeslot; and
- determine the corresponding power headroom based on the determined type of the PHR being the PHR type 1, and in combination with the actual transmission power of PUSCH in the any timeslot and the maximum transmission power of the PUSCH in the any timeslot.

18. The method of claim 4,
- wherein the PHR type 1 is determined based on an actual transmission power of the PUSCH in the timeslot and the maximum transmission power of the PUSCH in the timeslot, and
- wherein the PHR type 2 is determined based on the actual transmission power of the PUSCH in the timeslot, an actual transmission power of the first type of PUCCH, and the maximum transmission power of the first type of PUCCH and the PUSCH in the timeslot or the maximum transmission power of the PUSCH in the timeslot.

19. The device of claim 16,
- wherein the PHR type 1 is determined based on an actual transmission power of the PUSCH in the timeslot and the maximum transmission power of the PUSCH in the timeslot, and
- wherein the PHR type 2 is determined based on the actual transmission power of the PUSCH in the timeslot, an actual transmission power of the first type of PUCCH, and the maximum transmission power of the first type of PUCCH and the PUSCH in the timeslot or the maximum transmission power of the PUSCH in the timeslot.

* * * * *